(12) United States Patent
Ikegaya et al.

(10) Patent No.: US 10,364,562 B2
(45) Date of Patent: Jul. 30, 2019

(54) SANITARY WASHING DEVICE

(71) Applicant: TOTO LTD., Kitakyushu-shi, Fukuoka (JP)

(72) Inventors: Kenji Ikegaya, Kitakyushu (JP); Akiyoshi Takase, Kitakyushu (JP); Toshihiro Okamatsu, Kitakyushu (JP)

(73) Assignee: TOTO LTD., Kitakyushi-Shi, Fukuoka (JP)

( * ) Notice: Subject to any disclaimer, the term of this patent is extended or adjusted under 35 U.S.C. 154(b) by 0 days.

(21) Appl. No.: 16/132,565

(22) Filed: Sep. 17, 2018

(65) Prior Publication Data

US 2019/0093328 A1 Mar. 28, 2019

(30) Foreign Application Priority Data

Sep. 28, 2017 (JP) .................. 2017-188894

(51) Int. Cl.
*B05B 1/12* (2006.01)
*E03D 9/08* (2006.01)
*F24H 1/10* (2006.01)
*B05B 1/34* (2006.01)

(52) U.S. Cl.
CPC ............... *E03D 9/08* (2013.01); *F24H 1/102* (2013.01); *B05B 1/12* (2013.01); *B05B 1/3426* (2013.01)

(58) Field of Classification Search
CPC ...................................................... E03D 9/08

USPC ..................................................... 4/443–448
See application file for complete search history.

(56) References Cited

U.S. PATENT DOCUMENTS 5,390,277 A * 2/1995 Van Wagner ......... F24H 9/2028
219/485
2013/0256294 A1* 10/2013 Wurgler .................. E03C 1/044
219/441

FOREIGN PATENT DOCUMENTS

JP   H08-068096 A   3/1996
JP   2017-115332 A   6/2017

* cited by examiner

*Primary Examiner* — Christine J Skubinna
(74) *Attorney, Agent, or Firm* — Pearne & Gordon LLP

(57) ABSTRACT

A sanitary washing device according to an embodiment comprises: a heating part; a first temperature sensor configured to sense temperature of water heated by the heating part; a second temperature sensor provided downstream of the first temperature sensor and configured to sense temperature of the water; a nozzle provided downstream of the second temperature sensor and configured to jet the water toward human private parts; and a controlling part configured to determine that the second temperature sensor is abnormal when change of the temperature sensed by the first temperature sensor is larger than a predetermined first value and change of the temperature sensed by the second temperature sensor is smaller than a predetermined second value.

5 Claims, 13 Drawing Sheets

SANITARY WASHING DEVICE

CROSS-REFERENCE TO RELATED APPLICATIONS

This application is based upon and claims the benefit of priority from Japanese Patent Application No. 2017-188894, filed on Sep. 28, 2017; the entire contents of which are incorporated herein by reference.

FIELD

Embodiments described herein relate generally to a sanitary washing device.

BACKGROUND

There is known a sanitary washing device for jetting the water (warm water) heated by e.g. a heating part toward the user's private parts. Jetting heated water suppresses causing the user to feel discomfort from cool water and can improve usability.

On the other hand, in order not to cause discomfort to the user and to prevent a scald during jetting, it is desired not to jet excessively heated high-temperature water. However, high-temperature water may be jetted when a failure occurs in some components of the sanitary washing device, particularly in components of the washing system (such as members and devices related to jetting from the nozzle). For instance, when a failure (primary failure) occurs in the heating part or the element for controlling energization of the heating part, water may be unintentionally and excessively heated to result in jetting high-temperature water.

The sanitary washing device may be provided with a protective electronic circuit for preventing jetting of high-temperature water. The protective electronic circuit includes e.g. a temperature sensor such as a thermistor for measuring the temperature of the water heated by the heating part. When the measured temperature is high temperature, the protective electronic circuit closes the flow channel and stops jetting. However, a multiple failure may occur in which a failure (secondary failure) occurs in components of the protective electronic circuit in addition to e.g. the aforementioned primary failure. High-temperature water may be jetted also in this case. For instance, when an abnormality such as a failure occurs in the temperature sensor, the temperature cannot be measured correctly. Thus, jetting cannot be stopped even when the water reaches high temperature. Then, high-temperature water may be jetted toward the human body.

SUMMARY

A sanitary washing device according to an embodiment comprises a heating part, a first temperature sensor configured to sense temperature of water heated by the heating part, a second temperature sensor provided downstream of the first temperature sensor and configured to sense temperature of the water, a nozzle provided downstream of the second temperature sensor and configured to jet the water toward human private parts, and a controlling part configured to determine that the second temperature sensor is abnormal when change of the temperature sensed by the first temperature sensor is larger than a predetermined first value and change of the temperature sensed by the second temperature sensor is smaller than a predetermined second value.

DETAILED DESCRIPTION

Figure 1:
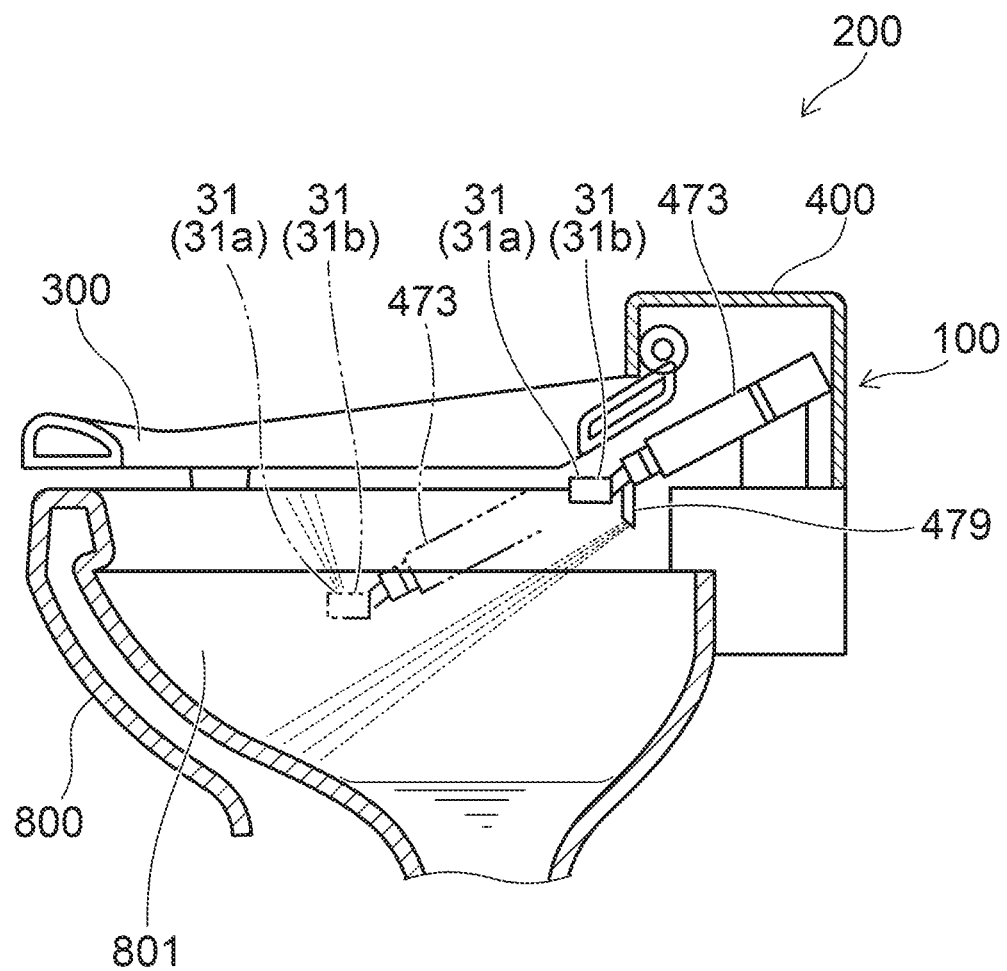
FIG. 1 is a sectional view showing a toilet device provided with a sanitary washing device according to an embodiment.

A first aspect of the invention is a sanitary washing device comprising: a heating part; a first temperature sensor configured to sense temperature of water heated by the heating part; a second temperature sensor provided downstream of the first temperature sensor and configured to sense temperature of the water; a nozzle provided downstream of the second temperature sensor and configured to jet the water toward human private parts; and a controlling part configured to determine that the second temperature sensor is abnormal when change of the temperature sensed by the first temperature sensor is larger than a predetermined first value and change of the temperature sensed by the second temperature sensor is smaller than a predetermined second value.

This sanitary washing device can sense that the second temperature sensor is abnormal. Thus, it can sense the possibility that high-temperature water is jetted from the nozzle.

A second aspect of the invention is a sanitary washing device according to the first aspect of the invention, wherein the first value is larger than the second value.

This sanitary washing device can sense the abnormality that the change of the temperature sensed by the second temperature sensor is small in spite of a large change of the temperature sensed by the first temperature sensor. In this case, false sensing can be reduced because the first value is larger than the second value.

A third aspect of the invention is a sanitary washing device according to the first or second aspect of the invention, wherein the controlling part determines that the second temperature sensor is normal when the change of the temperature sensed by the second temperature sensor is larger than or equal to the second value irrespective of the change of the temperature sensed by the first temperature sensor.

This sanitary washing device can reduce the time required for determining the abnormality of the second temperature sensor and reduce the burden on the controlling part.

A fourth aspect of the invention is a sanitary washing device according to any one of the first to third aspects of the invention, wherein the controlling part performs a first determination for determining whether or not the change of the temperature sensed by the second temperature sensor is smaller than the second value. After the first determination, the controlling part performs a second determination for determining whether or not the change of the temperature sensed by the first temperature sensor is larger than the first value. After the second determination, the controlling part performs a third determination for determining whether or not the change of the temperature sensed by the second temperature sensor is smaller than the second value.

This sanitary washing device first performs the first determination. This can reduce the time required for determining the abnormality of the second temperature sensor and reduce the burden on the controlling part. Then, the second determination and the third determination are performed. This can sense the abnormality that the change of the temperature sensed by the second temperature sensor is small in spite of the change of the temperature sensed by the first temperature sensor. Thus, the abnormality of the temperature sensor can be sensed more reliably.

A fifth aspect of the invention is a sanitary washing device according to any one of the first to fourth aspects of the invention, wherein the controlling part prohibits water supply to the nozzle upon determining that the second temperature sensor is abnormal.

This sanitary washing device can suppress jetting of high-temperature water from the nozzle toward the human body by prohibiting water supply to the nozzle.

Embodiments of the invention will now be described with reference to the drawings. In the drawings, similar components are marked with the same reference numerals, and the detailed description thereof is omitted appropriately.

FIG. 1 is a sectional view showing a toilet device provided with a sanitary washing device according to an embodiment.

As shown in FIG. 1, the toilet device 200 includes a sit-down toilet stool (hereinafter simply referred to as "toilet stool" for convenience of description) 800 and a sanitary washing device 100 provided thereon. The toilet stool 800 may be of the "floor-mounted type" installed on the floor surface of the toilet room, or of the "wall-mounted type" installed on the wall surface or the lining of the toilet room. The sanitary washing device 100 includes a casing 400, a toilet seat 300, and a toilet lid (not shown). The toilet seat 300 and the toilet lid are each pivotally supported on the casing 400 in an openable/closeable manner.

The casing 400 contains e.g. a body washing functional part for washing e.g. the "bottom" of the user seated on the toilet seat 300. The user may manipulate a manipulation part 500 (see FIG. 2) such as a remote control. Then, the washing nozzle (hereinafter simply referred to as "nozzle" for convenience of description) 473 can be advanced into the bowl 801 of the toilet stool 800 to jet water. In FIG. 1, the state of the nozzle 473 advanced from the casing 400 into the bowl 801 is shown by the dot-dashed line. The state of the nozzle 473 retracted from inside the bowl 801 and housed in the casing 400 is shown by the solid line.

A jetting port 31 is provided in the tip part of the nozzle 473. The nozzle 473 jets water from the jetting port 31 toward human private parts and washes the human private parts. The jetting port 31 may be provided in a plurality. For instance, the jetting port 31 includes e.g. a bidet washing jetting port 31a and a bottom washing jetting port 31b. The nozzle 473 can squirt water from the bidet washing jetting port 31a provided at its tip and wash the female private parts of a woman seated on the toilet seat 300. The nozzle 473 can squirt water from the bottom washing jetting port 31b provided at its tip and wash the "bottom" of a user seated on the toilet seat 300.

In this specification, "water" refers to not only cold water, but also heated hot water.

Figure 2:
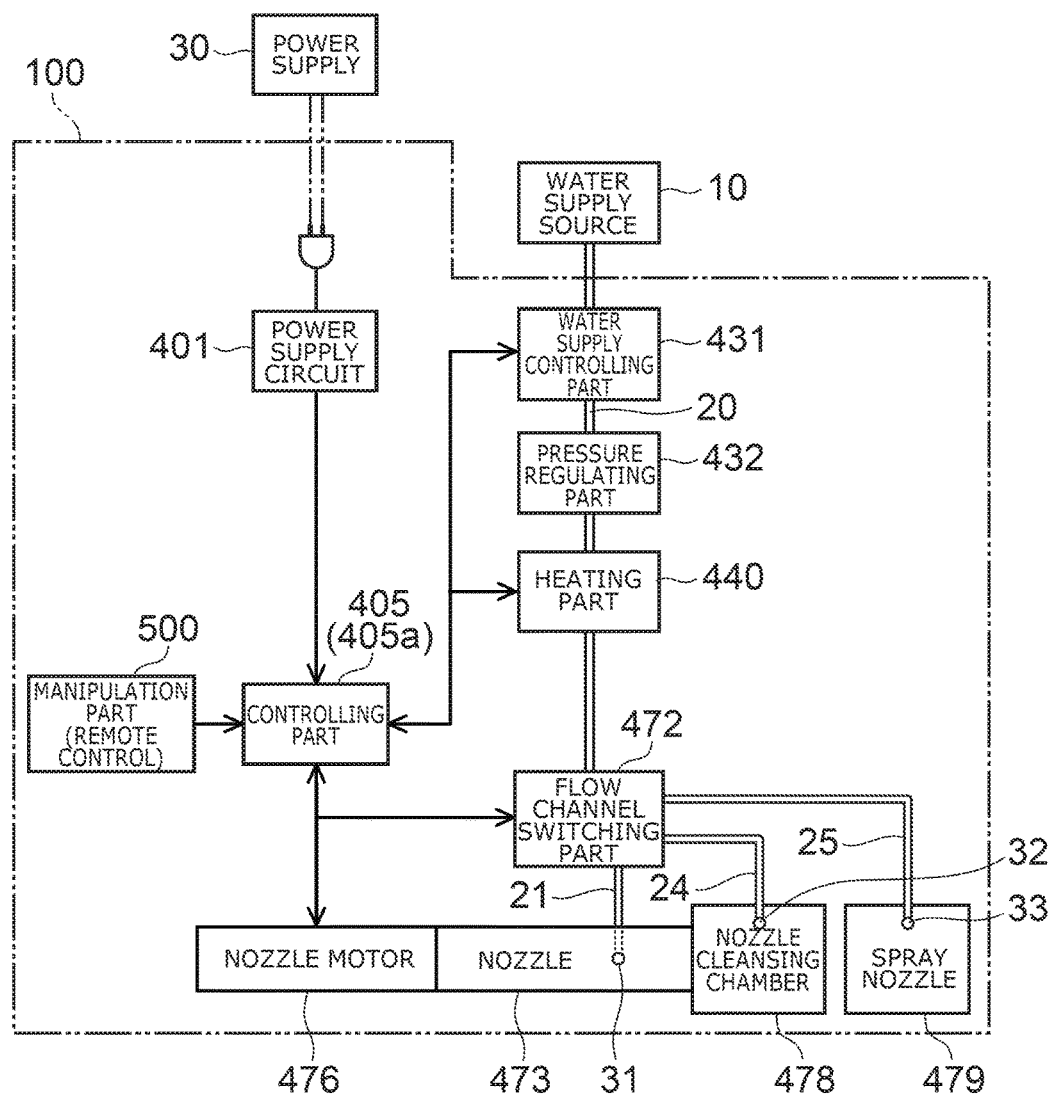
FIG. 2 is a block diagram illustrating a configuration of the sanitary washing device according to the embodiment.

FIG. 2 is a block diagram illustrating a configuration of the sanitary washing device according to the embodiment.

FIG. 2 shows the configuration of the water channel system and the electricity system in combination.

In this example, the sanitary washing device 100 includes, as the jetting part, a nozzle cleansing chamber 478 and a spray nozzle 479 in addition to the aforementioned nozzle 473 (washing nozzle). The nozzle cleansing chamber 478 and the spray nozzle 479 do not necessarily need to be provided.

The sanitary washing device 100 includes a water supply channel 20 placed in the casing 400. The water supply channel 20 allows the water supplied from a water supply source 10 such as tap water and a flush tank to be supplied to e.g. the nozzle 473, the nozzle cleansing chamber 478, and the spray nozzle 479.

The water supply channel 20 is provided with parts such as a water supply controlling part 431, a pressure regulating part 432, a heating part 440, and a flow channel switching part 472, and a plurality of piping connecting these parts. Besides, the water supply channel 20 may be appropriately provided with e.g. a check valve, a flow rate sensor, an electrolytic bath, and a vacuum breaker.

The water supply controlling part 431 is provided on the upstream side of the water supply channel 20. The water supply controlling part 431 controls water supply to downstream, i.e. water supply to e.g. the nozzle 473. The water supply controlling part 431 is e.g. an openable/closeable electromagnetic valve (solenoid valve). The water supply controlling part 431 controls water supply based on commands from a controlling part 405 provided inside the casing 400. In other words, the water supply controlling part 431 opens/closes the water supply channel 20. When the water supply controlling part 431 is placed in the open state, the water supplied from the water supply source 10 flows to the downstream side. When the water supply controlling part 431 is placed in the closed state, water supply to the downstream side is stopped. For instance, the water supply controlling part 431 controls water supply based on commands from part (first functional part 405a) of the controlling part 405. Here, the first functional part 405a refers to a functional block of the controlling part 405 for controlling the normal operation of the sanitary washing device 100 (the operation other than high-temperature jetting avoidance and failure diagnosis described later).

The pressure regulating part 432 is provided downstream of the water supply controlling part 431. The pressure regulating part 432 is a pressure regulating valve for regulating the pressure in the water supply channel 20 within a predetermined pressure range when e.g. the water supply pressure is high.

The heating part 440 (heat exchanger unit) is provided downstream of the pressure regulating part 432. The heating part 440 includes a heater. The heating part 440 heats the water supplied through the water supply controlling part 431 and the pressure regulating part 432 and raises its temperature to e.g. a prescribed temperature. That is, the heating part 440 generates warm water.

The heating part 440 is e.g. a heat exchanger of the instantaneous heating type (instantaneous type) using e.g. a ceramic heater. The heat exchanger of the instantaneous heating type can raise the temperature of water to a prescribed temperature in a shorter time than a heat exchanger of the hot water storage heating type using a hot water storage tank. The heating part 440 is not limited to the heat exchanger of the instantaneous heating type, but may be a heat exchanger of the hot water storage heating type. The heating part is not limited to the heat exchanger, but may be based on other heating schemes such as those based on microwave heating.

The heating part 440 is connected to the controlling part 405. The controlling part 405 (first functional part 405a) controls the heating part 440 in accordance with e.g. the user's manipulation of the manipulation part 500. Thus, the controlling part 405 raises the temperature of water to a temperature specified by the manipulation part 500.

The flow channel switching part 472 is provided downstream of the heating part 440. The flow channel switching part 472 is a switching valve for opening/closing or switching water supply to the nozzle 473 and the nozzle cleansing chamber 478. In this example, the flow channel switching part 472 functions also as a flow rate regulating part for regulating the flow rate. The flow rate regulating part and the flow channel switching part may be separate units. The flow channel switching part 472 is connected to the controlling part 405 and controlled by the controlling part 405 (first functional part 405a).

A washing flow channel 21 is provided downstream of the flow channel switching part 472. The nozzle 473 is provided downstream of the washing flow channel 21. The washing flow channel 21 allows the water supplied from the water supply source 10 through the water supply channel 20 to be guided to the jetting port 31 of the nozzle 473.

A bypass flow channel 24 is provided downstream of the flow channel switching part 472. The nozzle cleansing chamber 478 is provided downstream of the bypass flow channel 24. The bypass flow channel 24 allows the water supplied from the water supply source 10 through the water supply channel 20 to be guided to the jetting port 32 of the nozzle cleansing chamber 478.

A spraying flow channel 25 is provided downstream of the flow channel switching part 472. The spray nozzle 479 is provided downstream of the spraying flow channel 25. The spraying flow channel 25 allows the water supplied from the water supply source 10 through the water supply channel 20 to be guided to the jetting port 33 of the spray nozzle 479.

The flow channel switching part 472 selects a flow channel for supplying water from among the flow channels (e.g. the washing flow channel 21, the bypass flow channel 24, the spraying flow channel 25) provided downstream of the flow channel switching part 472. The flow channel selected by the flow channel switching part 472 is supplied with water. The flow channel switching part 472 can switch between the state of supplying water to the nozzle 473 (washing flow channel 21) and the state of supplying water to other than the nozzle 473. "Other than the nozzle 473" refers to e.g. the flow channel for passing water to the nozzle cleansing chamber 478 (bypass flow channel 24), the spray nozzle 479 (spraying flow channel 25), and the bowl 801.

The flow channel switching part 472 may stop the water supplied from upstream in the flow channel switching part 472.

The nozzle 473 is advanced into or retracted from the bowl 801 of the toilet stool 800 under a driving force from a nozzle motor 476. That is, the nozzle motor 476 advances and retracts the nozzle 473 based on commands from the controlling part 405 (first functional part 405a).

In the state of being advanced forward from the casing 400, the nozzle 473 jets the water heated by the heating part 440 and supplied from the flow channel switching part 472 towards human private parts to perform washing.

The nozzle cleansing chamber 478 causes the water supplied from the flow channel switching part 472 to be squirted from the jetting port 32 provided inside the nozzle cleansing chamber 478. Thus, the nozzle cleansing chamber 478 cleanses the outer peripheral surface (body) of the nozzle 473. The spray nozzle 479 causes the water supplied from the flow channel switching part 472 to be sprayed in mist form to the bowl 801 from the jetting port 33 provided at the tip of the spray nozzle 479.

The controlling part 405 (first functional part 405a) switches opening/closing of the flow channels such as the washing flow channel 21, the bypass flow channel 24, and the spraying flow channel 25 by controlling the flow channel switching part 472.

The controlling part 405 includes a control circuit such as a microcomputer. The controlling part 405 is e.g. a CPU (central processing unit). The controlling part 405 is supplied with electric power from a power supply 30 through a power supply circuit 401. The controlling part 405 (first functional part 405a) controls the operation of e.g. the water supply controlling part 431, the heating part 440, the flow channel switching part 472, and the nozzle motor 476 based on signals from e.g. the manipulation part 500.

The casing 400 may be appropriately provided with e.g. a "warm air drying function" for blowing warm air toward e.g. the "bottom" of the user seated on the toilet seat 300 and drying the "bottom", a "deodorizing function", a "toilet seat warming function", and a "room warming function". These additional functional parts do not necessarily need to be provided.

Figure 3:
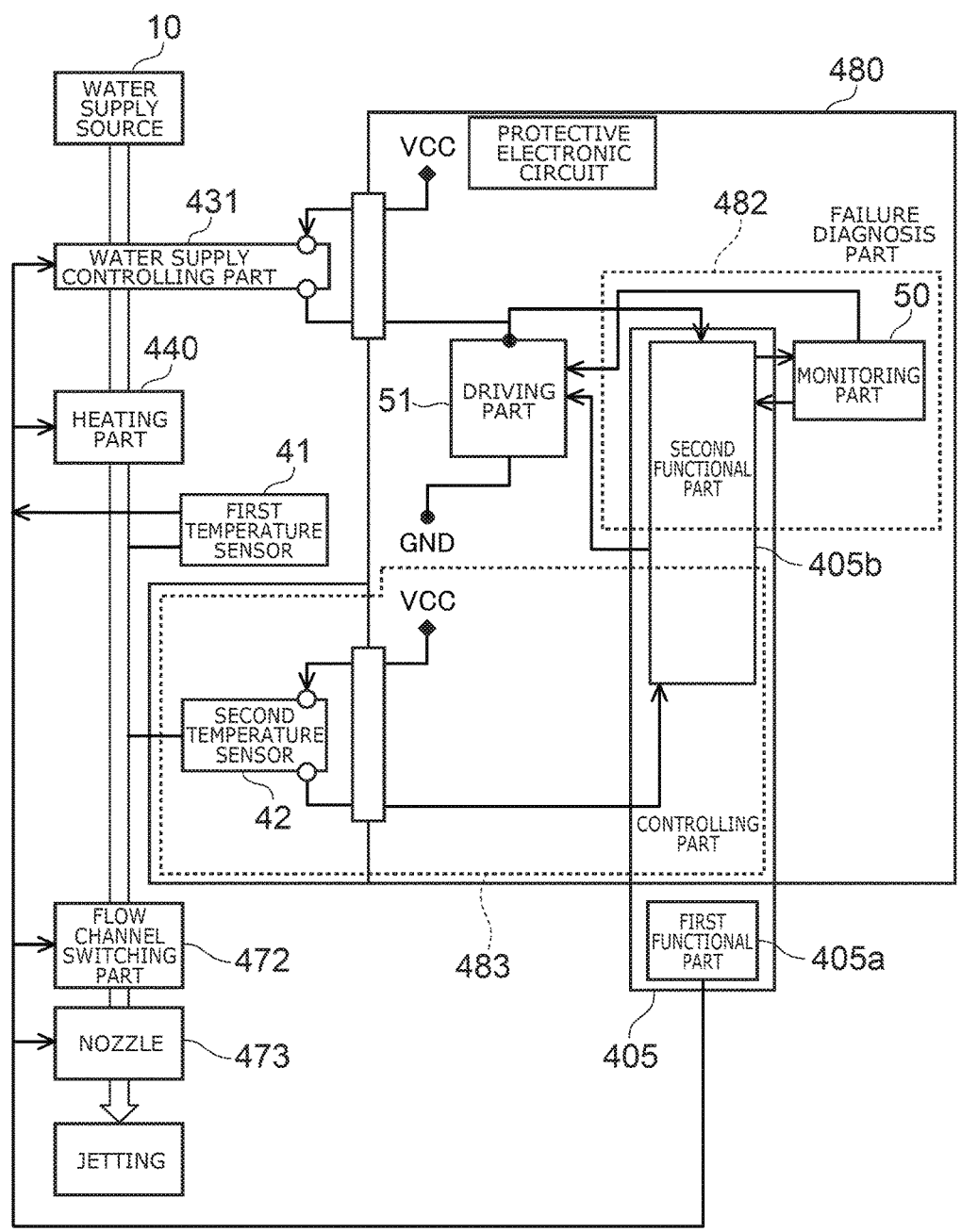
FIG. 3 is a block diagram illustrating the configuration of the sanitary washing device according to the embodiment.

FIG. 3 is a block diagram illustrating the configuration of the sanitary washing device according to the embodiment. FIG. 3 shows the configuration of the water channel system and the electricity system in combination.

As shown in FIG. 3, the controlling part 405 includes the aforementioned first functional part 405a and a second functional part 405b. The second functional part 405b is a functional block related to high-temperature jetting avoidance and failure diagnosis of components of the sanitary washing device 100 described below. The first functional part 405a and the second functional part 405b represent the function of the controlling part 405 for convenience of description, and do not necessarily need to represent the hardware configuration.

The sanitary washing device 100 includes a first temperature sensor 41. The first temperature sensor 41 is provided downstream of the heater of the heating part 440. The first temperature sensor 41 can sense the temperature of the water flowing on the downstream side of the heating part 440. The first temperature sensor 41 is based on e.g. a thermistor.

The controlling part 405 (first functional part 405a) is electrically connected to the first temperature sensor 41 and obtains the information of the temperature sensed by the first temperature sensor 41. The first functional part 405a controls the heating part 440 based on the sensing result of the first temperature sensor 41. Thus, the first functional part 405a adjusts the temperature of the water supplied downstream of the heating part 440.

The sanitary washing device 100 further includes a protective electronic circuit 480. The protective electronic circuit 480 is a circuit for prohibiting the operation of at least part of the sanitary washing device 100 when a component of the sanitary washing device 100 fails. For instance, the protective electronic circuit 480 prohibits jetting from the nozzle 473 when a failure occurs in the washing system of the sanitary washing device 100. The washing system refers to members and devices related to jetting from the nozzle 473. For instance, the washing system refers to members and devices provided on the water supply channel 20 shown in FIGS. 2 and 3. More specifically, the washing system includes components such as the water supply controlling part 431, the pressure regulating part 432, the heating part 440, the flow channel switching part 472, the nozzle 473, and the protective electronic circuit 480. The range of failures of the washing system includes a failure leading to high-temperature jetting.

In this example, the protective electronic circuit 480 is a circuit for preventing jetting of high-temperature water from the nozzle 473. The protective electronic circuit 480 includes a high-temperature jetting avoidance part 483 for avoiding jetting of high-temperature water heated by the heating part 440 from the nozzle 473. For instance, the high-temperature jetting avoidance part 483 is composed of a second temperature sensor 42 and part of the second functional part 405b.

The second temperature sensor 42 is provided downstream of the first temperature sensor 41. The second temperature sensor 42 can sense the temperature of the water flowing on the downstream side of the heating part 440. The flow channel switching part 472 and the nozzle 473 are provided downstream of the second temperature sensor 42. The second temperature sensor 42 is based on e.g. a thermistor.

The controlling part 405 (second functional part 405b) is electrically connected to the second temperature sensor 42 and obtains the information of the temperature sensed by the second temperature sensor 42. The controlling part 405 (second functional part 405b) prohibits at least one of heating in the heating part 440 and jetting from the nozzle 473 when the temperature sensed by the second temperature sensor 42 is higher than a predetermined temperature. This can suppress jetting of high-temperature water from the nozzle 473. "Prohibiting" an operation refers to maintaining stoppage of the operation. In other words, "prohibiting" an operation refers to stopping the operation when the operation is performed, and not starting the operation when the operation is not performed.

For instance, the controlling part 405 (second functional part 405b) prohibits jetting to human private parts by the nozzle 473 when the sensing result of the second temperature sensor 42 has exceeded a predetermined temperature or exceeds a predetermined temperature continuously for a fixed time. This can prevent high-temperature water from splashing on the human body even when the water is excessively heated by the heating part 440.

For this prohibition, the controlling part 405 (second functional part 405b) performs e.g. at least one of the following controls. For instance, the controlling part 405 retracts and houses the nozzle 473 by controlling the nozzle motor 476. For instance, the controlling part 405 closes the washing flow channel 21 for supplying water to the jetting port 31 of the nozzle 473 by controlling the flow channel switching part 472. At this time, high-temperature water is supplied to other than the nozzle 473 and drained. Alternatively, high-temperature water may be stopped in the flow channel switching part 472. For instance, the controlling part 405 prohibits water supply to downstream of the water supply controlling part 431 by controlling the water supply controlling part 431. For instance, the controlling part 405 prohibits transport of water to the nozzle 473 by controlling the transporting part 436 described later. Furthermore, supply of electric power to at least part of the sanitary washing device 100 may be blocked at the time of the aforementioned prohibition. For instance, heating of water may be prohibited by prohibiting energization of the heater of the heating part 440. Jetting by the nozzle 473 may be prohibited by blocking supply of electric power to at least part of the sanitary washing device 100.

Thus, the high-temperature jetting avoidance part 483 avoids jetting of high-temperature water heated by the heating part 440 from the nozzle 473. Specifically, the high-temperature jetting avoidance part 483 prohibits water supply to the nozzle 473 based on the temperature sensed by the second temperature sensor 42. In this specification, "high temperature" is a temperature more than or equal to the temperature at which the user feels discomfort. The range of "high temperature" is defined appropriately. The "high temperature" refers to being higher than a predetermined temperature. This predetermined temperature is a temperature such that e.g. the user may be scalded. Accordingly, the temperature of the second temperature sensor 42 for prohibiting jetting can also be predetermined appropriately. The temperature of water may become high temperature when e.g. trouble occurs in the triac for controlling energization of the heater of the heating part 440.

For instance, when a failure occurs in the second temperature sensor 42, the temperature cannot be measured correctly. Thus, emergency stop of jetting of the nozzle 473 may not be performed even when the temperature of water is high temperature. In this respect, in the embodiment, the controlling part 405 (second functional part 405b) senses abnormality of the second temperature sensor 42 based on the measurement result of the first temperature sensor 41 and the measurement result of the second temperature sensor 42.

Specifically, the controlling part 405 determines that the second temperature sensor 42 is abnormal when the temperature sensed by the first temperature sensor 41 is varied and the temperature sensed by the second temperature sensor 42 is not varied. This enables sensing that the second temperature sensor 42 may have failed, and sensing the possibility that high-temperature water is jetted.

In this specification, the range of "temperature not varied" also includes the case where the temperature is varied in the range to the extent of measurement dispersion. In other words, it is regarded that the temperature is not varied when the change of temperature is less than or equal to a predetermined value. This value is defined appropriately in view of e.g. measurement dispersion. The value is e.g. approximately ±1° C.

The controlling part 405 (second functional part 405b) prohibits water supply to the nozzle 473 upon determining that the second temperature sensor 42 is abnormal. For instance, the controlling part 405 prohibits water supply to the nozzle 473 from the water supply controlling part 431 by maintaining the water supply controlling part 431 in the closed state. The controlling part 405 may prohibit water supply to the nozzle 473 by controlling the flow channel switching part 472. In this case, the flow channel switching part 472 maintains either the state of selecting the flow channel other than the washing flow channel 21 or the state of stopping water from upstream in the flow channel switching part 472. Alternatively, in the case where the open tank 434 and the transporting part 436 described later are provided, the controlling part 405 may prohibit water supply to the nozzle 473 from the transporting part 436 by maintaining the state of stopping the operation of the transporting part 436. The controlling part 405 may perform the control like the aforementioned prohibition when abnormality of the second temperature sensor 42 is sensed. Thus, jetting of high-temperature water from the nozzle 473 toward the human body can be suppressed by prohibiting water supply to the nozzle 473.

An example of determining abnormality of the second temperature sensor 42 is described with reference to FIG. 4.

Figure 4:
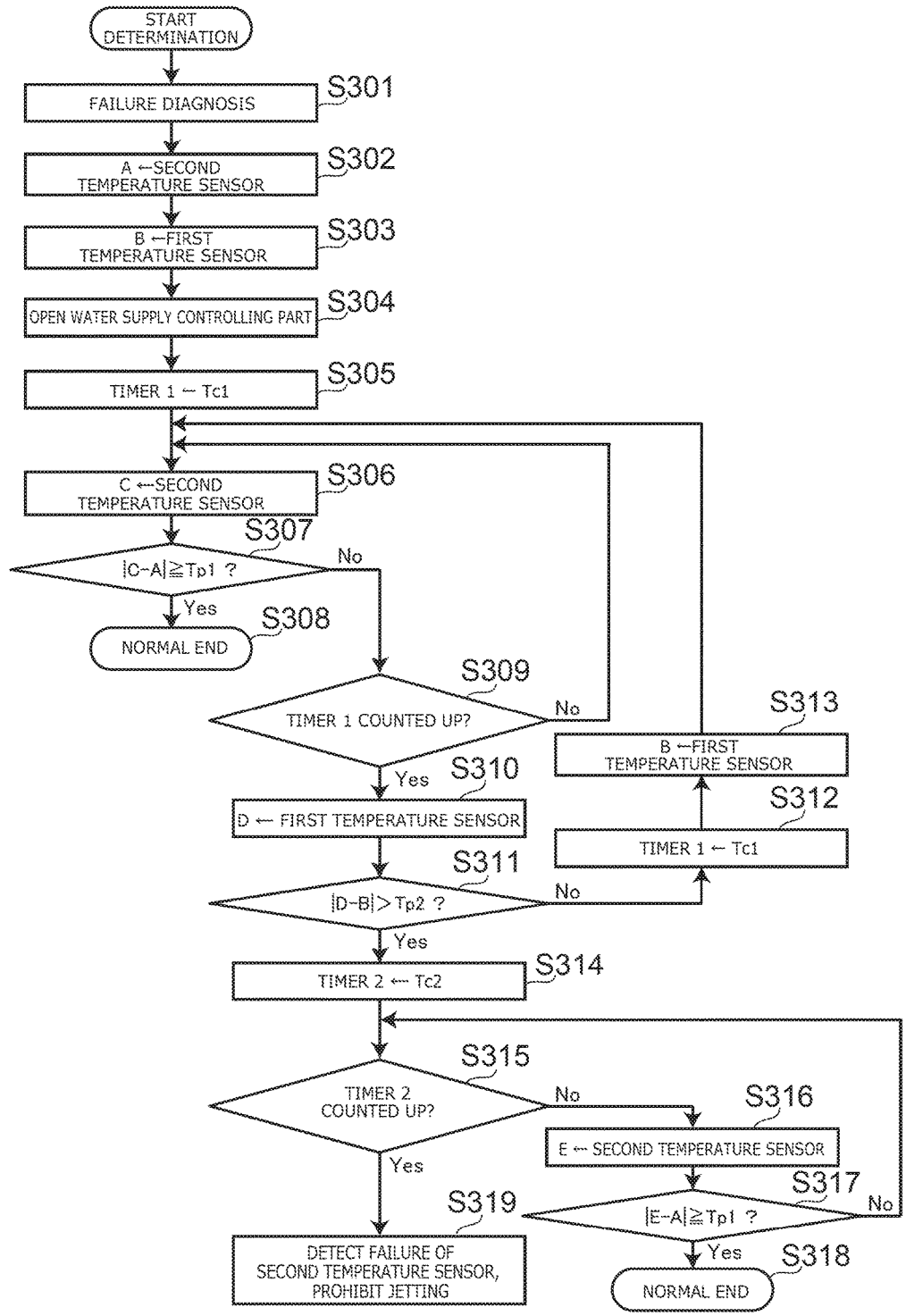
FIG. 4 is a flow chart illustrating the operation of the sanitary washing device according to the embodiment.

FIG. 4 is a flow chart illustrating the operation of the sanitary washing device according to the embodiment.

The controlling part 405 first performs e.g. failure diagnosis of the sanitary washing device 100 (step S301). This failure diagnosis corresponds to e.g. steps S202, S206, S209 described later with reference to FIG. 6. When no failure is sensed, jetting from the nozzle 473 is permitted.

Subsequently, the controlling part 405 obtains the measurement value of the second temperature sensor 42 (step S302). The temperature measured by the second temperature sensor 42 in step S302 is denoted by A.

Next, the controlling part 405 obtains the measurement value of the first temperature sensor 41 (step S303). The temperature measured by the first temperature sensor 41 in step S303 is denoted by B.

Subsequently, the water supply controlling part 431 and the like are placed in the open state to start water supply to the nozzle 473 (step S304). In response thereto, the controlling part 405 starts counting a predetermined time Tc1 by a timer (step S305). The time Tc1 is e.g. approximately 1 second. At this time, heating of water is performed by the heating part 440.

Next, the controlling part 405 obtains again the measurement value of the second temperature sensor 42 (step S306). The temperature measured by the second temperature sensor 42 in step S306 is denoted by C.

When the absolute value of the difference between C and A is more than or equal to a predetermined value Tp1 (step S307: Yes), the controlling part 405 determines that the second temperature sensor 42 is not abnormal (step S308). The predetermined value Tp1 is e.g. approximately 1° C. When the absolute value of the difference between C and A is less than the predetermined value Tp1 (step S307: No), step S306 and step S307 are repeated until the counting of the time Tc1 is ended (step S309: No). When the absolute value of the difference between C and A becomes more than or equal to the predetermined value Tp1 (step S307: Yes) during counting the time Tc1, the controlling part 405 determines that the second temperature sensor 42 is not abnormal (step S308).

When the absolute value of the difference between C and A remains less than the predetermined value Tp1 and the counting of the time Tc1 is ended (step S309: Yes), the controlling part 405 obtains the measurement value of the first temperature sensor 41 (step S310). The temperature measured by the first temperature sensor 41 in step S310 is denoted by D.

When the absolute value of the difference between B and D is less than or equal to a predetermined value Tp2 (step S311: No), the controlling part 405 starts counting the time Tc1 (step S312) and obtains the measurement value of the first temperature sensor 41 (step S313). The value of B is updated to the temperature measured by the first temperature sensor 41 in step S313. The predetermined value Tp2 is larger than the predetermined value Tp1, such as approximately 10° C.

Steps S306-S311 are repeated after step S313. This repetition processing is repeated until the absolute value of the difference between B and D becomes larger than the predetermined value Tp2. In other words, steps S306-S311 are repeated until the measurement result of the first temperature sensor 41 changes greater than the predetermined value Tp2 during the time Tc1. Step S311 may determine that D−B>Tp2 instead of the absolute value. In other words, step S311 may determine the increase of temperature.

When the absolute value of the difference between B and D is larger than the predetermined value Tp2 (step S311: Yes), the controlling part 405 starts counting a predetermined time Tc2 (step S314). The time Tc2 is e.g. approximately 10 seconds.

When the counting of the time Tc2 is not ended (step S315: No), the controlling part 405 obtains the measurement value of the second temperature sensor 42 (step S316). The temperature measured by the second temperature sensor 42 in step S316 is denoted by E.

When the absolute value of the difference between E and A is more than or equal to the predetermined value Tp1 (step S317: Yes), the controlling part 405 determines that the second temperature sensor 42 is not abnormal (step S318). When the absolute value of the difference between E and A is less than the predetermined value Tp1 (step S317: No), steps S316 and S317 are repeated until the counting of the time Tc2 is ended.

When the absolute value of the difference between E and A remains less than the predetermined value Tp1 and the counting of the time Tc2 is ended (step S315: Yes), the controlling part 405 determines that the second temperature sensor 42 is abnormal and prohibits water supply to the nozzle 473 (step S319). For instance, the controlling part 405 controls the water supply controlling part 431 and places it in the closed state.

Thus, the controlling part 405 performs a first determination for determining whether or not the change of the temperature sensed by the second temperature sensor 42 is larger than the value Tp1 (step S307). After the first determination, the controlling part 405 performs a second determination for determining whether or not the change of the temperature sensed by the first temperature sensor 41 is larger than the value Tp2 (step S311). After the second determination, the controlling part 405 performs a third determination for determining whether or not the change of the temperature sensed by the second temperature sensor 42 is smaller than the value Tp1 (step S317). That is, after the temperature of the second temperature sensor 42 is determined in step S307, the temperature of the second temperature sensor 42 is determined again in step S317. At this time, according to the determination of step S311, the temperature of the first temperature sensor 41 is varied relatively greatly. That is, step S317 can determine the abnormality that the temperature of the second temperature sensor 42 is not varied in spite of the variation of the temperature of the first temperature sensor 41. At this time, false sensing can be reduced because the predetermined value Tp2 is larger than the predetermined value Tp1.

Thus, for instance, the controlling part 405 determines that the second temperature sensor 42 is abnormal when the change of the temperature sensed by the first temperature sensor 41 is larger than the predetermined first value (value Tp2) and the change of the temperature sensed by the second temperature sensor 42 is smaller than the predetermined second value (value Tp1). Accordingly, the possibility of jetting of high-temperature water can be sensed more reliably.

As in steps S307 and S308, the controlling part 405 determines that the second temperature sensor 42 is normal when the change of the temperature sensed by the second temperature sensor 42 is larger than or equal to the predetermined second value (value Tp1) irrespective of the change of the temperature sensed by the first temperature sensor 41. This can reduce the time required for the determination of abnormality and reduce the burden on the controlling part 405. For instance, the controlling part 405 can terminate the determination without waiting for the change of the temperature of the first temperature sensor 41.

Also in steps S317 and S318, the determination of abnormality of the second temperature sensor 42 is terminated immediately when the temperature sensed by the second temperature sensor 42 is varied. This can reduce the time required for the determination of abnormality and reduce the burden on the controlling part 405.

The controlling part 405 may sense abnormality of the first temperature sensor 41 instead of abnormality of the second temperature sensor 42. That is, for instance, the controlling part 405 may determine that the first temperature sensor 41 is abnormal when the temperature sensed by the second temperature sensor 42 is varied and the temperature sensed by the first temperature sensor 41 is not varied.

After starting passing water to the nozzle 473, the water supply controlling part 431 may be closed e.g. to stop washing upon receipt of a signal for terminating passing water. In this case, the flow of determining abnormality shown in FIG. 4 is aborted even in midstream.

As shown in FIG. 3, the protective electronic circuit 480 further includes a failure diagnosis part 482 (failure diagnosis circuit). The failure diagnosis part 482 is a circuit for diagnosing a failure of components of the protective electronic circuit 480.

Before starting jetting from the nozzle 473, a failure of components of the protective electronic circuit 480 may be sensed by diagnosis using the failure diagnosis part 482. Then, water supply from the water supply source 10 to the nozzle 473 is prohibited. For instance, when a failure is sensed, the second functional part 405b controls the water supply controlling part 431 by a driving part 51 as shown in FIG. 3. Thus, water supply to the nozzle 473 by the water supply controlling part 431 is prohibited. That is, the closed state of the water supply controlling part 431 is maintained.

Alternatively, when a failure of components of the protective electronic circuit 480 is sensed by diagnosis using the failure diagnosis part 482, heating of water may be prohibited by prohibiting energization of the heater of the heating part 440. Alternatively, supply of electric power to at least part of the sanitary washing device 100 may be blocked. The operation of at least part of the components of the washing system can be prohibited by blocking supply of electric power. This can prohibit water supply from the water supply source 10 to the nozzle 473. For instance, the connection in the power supply circuit 401 described with reference to FIG. 2 is turned off to block supply of electric power from the power supply 30 to the power supply circuit 401.

In the example shown in FIG. 3, the failure diagnosis part 482 is a circuit for diagnosing a failure of the high-temperature jetting avoidance part 483. The failure diagnosis part 482 performs failure diagnosis on each part of the high-temperature jetting avoidance part 483 (e.g. each of the controlling part 405 (second functional part 405b), the second temperature sensor 42, and a high temperature sensing part 481 described later). When a failure of components of the high-temperature jetting avoidance part 483 is sensed by diagnosis using the failure diagnosis part 482, water supply to the nozzle 473 by the water supply controlling part 431 is prohibited.

As described above, the failure diagnosis part 482 thus provided enables sensing a failure of components of the protective electronic circuit 480 (e.g. a failure of the high-temperature jetting avoidance part). This can suppress jetting of high-temperature water from the nozzle 473 toward the human body.

Conventionally, in order to prevent jetting of high-temperature water, the temperature of heated water is measured after starting water supply to the nozzle 473. The water supply is controlled in accordance with the measurement result. In contrast, in the embodiment, water supply to the nozzle 473 is prohibited by a failure of components. This can sense a sign of abnormality (failure of components) before starting jetting, and prevent jetting of high-temperature water from the nozzle 473.

The configuration of the circuit (e.g. the driving part 51) for driving the electromagnetic valve is relatively simple. For instance, the number of components of the circuit for driving the electromagnetic valve is smaller than the number of components of the circuit for driving the flow channel switching part 472 and the number of components of the circuit for driving the nozzle motor 476. Thus, the time required for diagnosis can be reduced when an electromagnetic valve is used for the water supply controlling part 431 and failure diagnosis is performed on the circuit for driving the electromagnetic valve.

Passing water to the heating part 440 can be prohibited by prohibiting water supply to the nozzle 473 in the water supply controlling part 431 located on the upstream side of the heating part 440. This can avoid such a situation in which water keeps boiling in the heating part 440 even in the unlikely case that a failure occurs in the heating part 440 and heating by the heating part 440 continues. Thus, the tank of the heating part 440 can avoid breakage and water leakage.

The protective electronic circuit 480 is further described with reference to FIG. 3.

The protective electronic circuit 480 includes a driving part 51 for driving the water supply controlling part 431. The driving part 51 is e.g. a switching circuit including a transistor. The driving part 51 controls the operation (opening/closing) of the water supply controlling part 431. In this example, the driving part 51 is a circuit for driving the water supply controlling part 431. Alternatively, the driving part 51 may be a circuit for controlling the operation of one of the heating part 440, the flow channel switching part 472, and the transporting part 436 (described later with reference to FIG. 12). For instance, the driving part 51 may control e.g. on/off of energization of the heater of the heating part 440, switching of flow channels of the flow channel switching part 472, or start/stop of the operation of the transporting part.

The failure diagnosis part 482 of the protective electronic circuit 480 includes part of the second functional part 405b and a monitoring part 50. The monitoring part 50 is a circuit including e.g. an IC (integrated circuit) and electrically connected to the controlling part 405 (second functional part 405b) and the driving part 51. The monitoring part 50 diagnoses a failure of the controlling part 405. When the controlling part 405 fails, the monitoring part 50 prohibits at least one of heating in the heating part 440 and jetting from the nozzle 473. In the example shown in FIG. 3, upon determining that the controlling part 405 fails, the monitoring part 50 controls the driving part 51 to maintain the water supply controlling part 431 in the closed state. The monitoring part 50 may turn off the heater of the heating part 440, prohibit water supply to the nozzle 473 by the flow channel switching part 472, or prohibit water supply to the nozzle 473 by the transporting part.

The controlling part 405 (second functional part 405*b*) diagnoses a failure of the monitoring part 50. When the monitoring part 50 fails, the controlling part 405 prohibits at least one of heating in the heating part 440 and jetting from the nozzle 473. In the example shown in FIG. 3, upon determining that the monitoring part 50 fails, the controlling part 405 (second functional part 405*b*) controls the driving part 51 to maintain the water supply controlling part 431 in the closed state. The controlling part 405 may turn off the heater of the heating part 440, prohibit water supply to the nozzle 473 by the flow channel switching part 472, or prohibit water supply to the nozzle 473 by the transporting part.

Thus, when a failure occurs in the controlling part 405 or the monitoring part 50 of the protective electronic circuit 480, at least one of heating and jetting of water is prohibited. This can suppress jetting of high-temperature water from the nozzle 473 toward the human body. For instance, jetting of high-temperature water can be suppressed even when a multiple failure occurs such that both the heating part 440 and the protective electronic circuit 480 fail.

The controlling part 405 (second functional part 405*b*) diagnoses a failure of the driving part 51. Upon determining that the driving part 51 fails, the controlling part 405 prohibits water supply to the nozzle 473 by the water supply controlling part 431. Specifically, upon determining that part of the driving part 51 fails, the controlling part 405 (second functional part 405*b*) controls the driving part 51 to maintain the water supply controlling part 431 in the closed state. This can further suppress jetting of high-temperature water.

Figure 5:
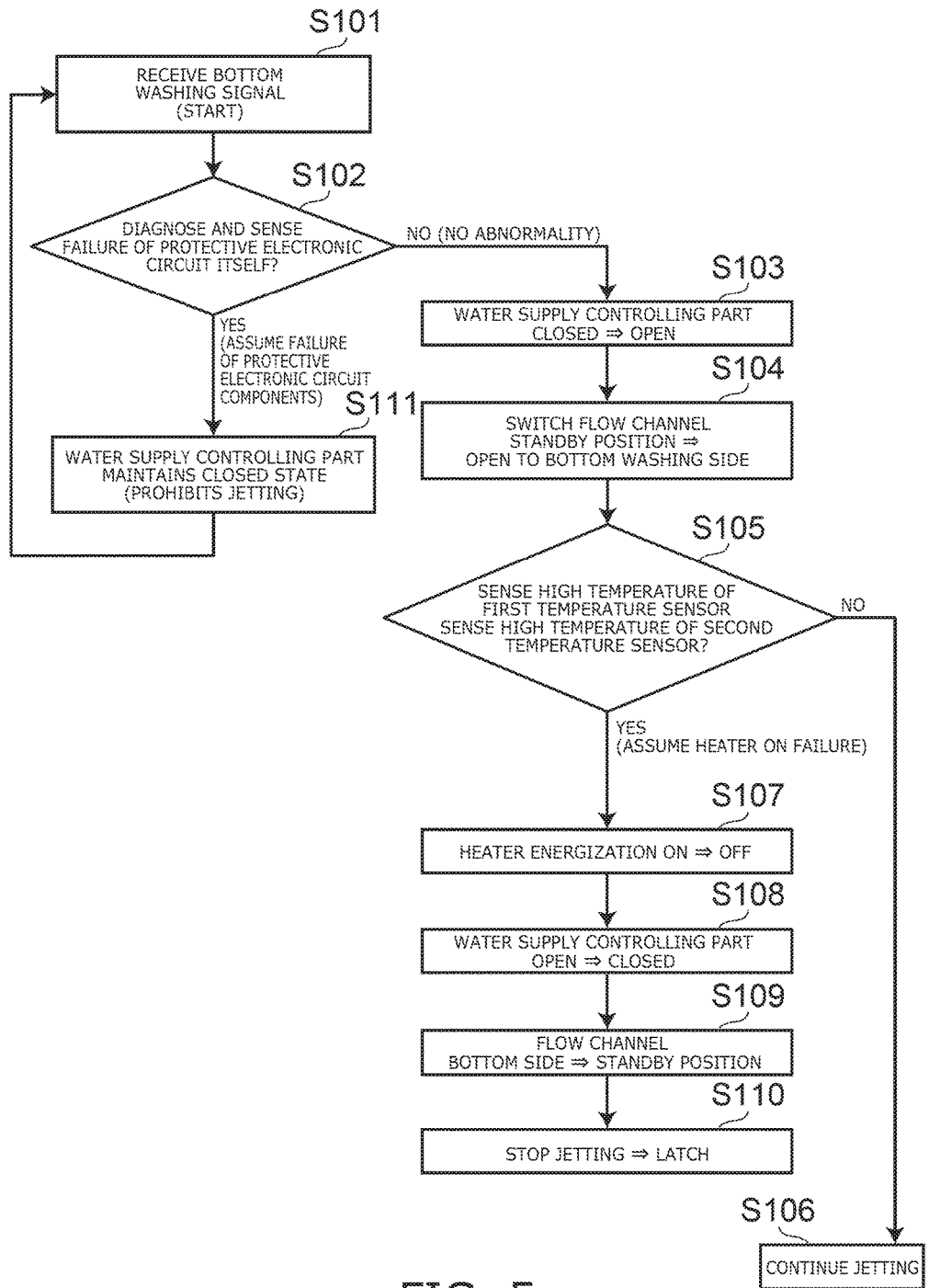
FIGS. 5 and 6 are flow charts illustrating the operation of the sanitary washing device according to the embodiment.
Figure 6:
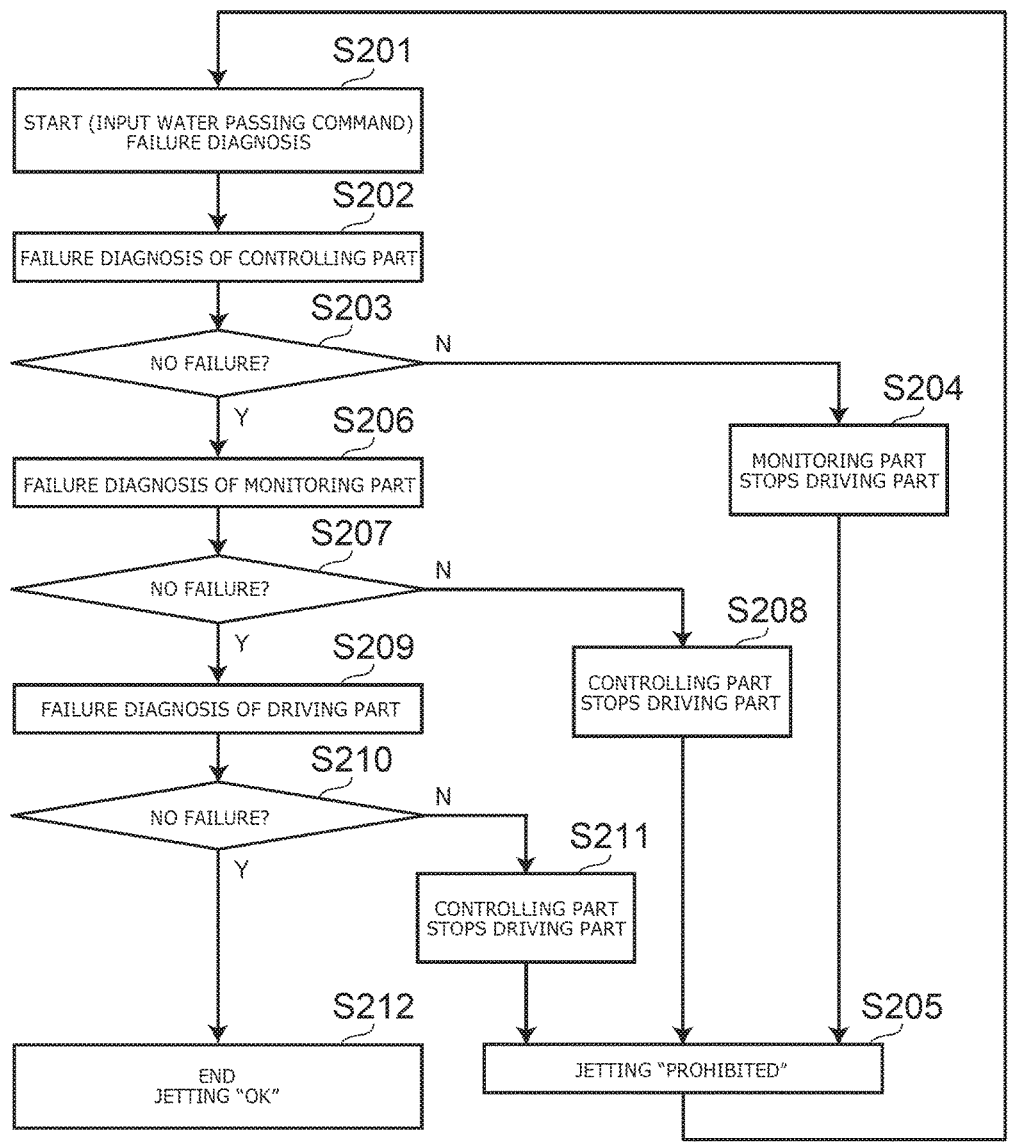

FIGS. 5 and 6 are flow charts illustrating the operation of the sanitary washing device according to the embodiment.

As shown in FIG. 5, for instance, the user manipulates the manipulation part 500 to send a signal (e.g. bottom washing signal) for instructing jetting from the nozzle 473. In response thereto, the controlling part 405 is inputted with a command for passing water to the nozzle 473 (step S101). Then, the protective electronic circuit 480 performs failure diagnosis of the protective electronic circuit 480 by the failure diagnosis part 482 before starting jetting from the nozzle 473 (step S102).

When no failure is sensed in step S102, steps S103-S110 are performed. When a failure is sensed in step S102, jetting from the nozzle 473 is prohibited (step S111).

Thus, in the embodiment, diagnosis using the failure diagnosis part 482 is performed before (immediately before) starting water supply to the nozzle 473. "Before (immediately before) starting water supply" refers to the time from sending of the signal for instructing jetting from the nozzle 473 until water supply to the nozzle 473 is started. That is, in the example of FIG. 5, step S102 is performed between step S101 and step S103. Thus, jetting of high-temperature water can be prevented more reliably.

In step S103, the water supply controlling part 431 is opened. Subsequently, the flow channel of water is switched in the flow channel switching part 472. This opens the flow channel (washing flow channel 21) for supplying water to the nozzle 473 (step S104). Then, jetting is performed from the jetting port 31 of the nozzle 473 toward the user's private parts.

During jetting, the controlling part 405 obtains the sensing result of the first temperature sensor 41 and the sensing result of the second temperature sensor 42. When the temperature sensed by the first temperature sensor 41 and the second temperature sensor 42 is not high temperature (step S105: No), jetting from the nozzle 473 is continued (step S106).

When the temperature sensed by the first temperature sensor 41 or the second temperature sensor 42 is high temperature (step S105: Yes), a failure is assumed in e.g. the heater of the heating part 440. Thus, the controlling part 405 prohibits energization of the heater of the heating part 440 (step S107). The controlling part 405 or the high temperature sensing part 481 turns the water supply controlling part 431 from the open state to the closed state (step S108). Furthermore, the controlling part 405 controls the flow channel switching part 472 to close the flow channel for supplying water to the nozzle 473 (step S109).

Jetting from the nozzle 473 is prohibited by steps S107-S109. Then, the circuit for jetting from the nozzle 473 is latched (step S110). That is, after step S110, the user may manipulate the manipulation part 500, and the controlling part 405 may be inputted again with a command for passing water. Even in this case, the processing of steps S102-S111 is not performed, and jetting from the nozzle 473 is not performed. This latched state is canceled by e.g. stopping and restarting supply of electric power to the controlling part 405 (power restart). That is, at least one of heating in the heating part 440 and jetting from the nozzle 473 is prohibited when the temperature sensed by the second temperature sensor 42 is higher than a predetermined temperature. This prohibited state is not canceled until power restart of the controlling part 405 is performed. This can further suppress jetting of high-temperature water.

On the other hand, after step S111, the circuit is not latched as in step S110. That is, after step S111, when the user manipulates the manipulation part 500, the controlling part 405 is inputted again with a water passing command. Then, step S102 is performed again. When no failure is sensed, steps S103-S110 are performed. For instance, the monitoring part 50 diagnoses again a failure of the controlling part 405. The controlling part 405 diagnoses again a failure of the monitoring part 50. A failure of the controlling part 405 or a failure of the monitoring part 50 prohibits at least one of heating in the heating part 440 and jetting from the nozzle 473. This prohibited state is canceled when no failure is sensed by rediagnosis of a failure of the controlling part 405 by the monitoring part 50 and no failure is sensed by rediagnosis of a failure of the monitoring part 50 by the controlling part 405. Thus, the state of prohibiting heating in the heating part 440 and jetting from the nozzle 473 by diagnosis using the failure diagnosis part 482 is canceled when diagnosis of the failure diagnosis part 482 is performed again and no failure is sensed. Accordingly, even when false sensing of a failure occurs due to e.g. disturbance noise, failure diagnosis can be performed again to jet water. This can improve usability. Even when jetting is prohibited by step S111, functions of the sanitary washing device 100 irrelevant to jetting (such as warm air drying, deodorization, and toilet seat warming) are kept effective. This can improve usability.

When jetting from the nozzle 473 is prohibited in step S111, a state displaying part may notify the user that a failure is sensed. The state displaying part can be based on arbitrary notifying means such as LED, liquid crystal, and organic EL. The state displaying part is provided in e.g. the manipulation part 500 or the casing 400.

An example of the processing in steps S101, S102, and S111 shown in FIG. 5 is described with reference to FIG. 6.

As shown in FIG. 6, when the controlling part 405 is inputted with a command for passing water to the nozzle 473, the protective electronic circuit 480 starts failure diagnosis (step S201).

In the failure diagnosis, for instance, the monitoring part 50 first determines the presence or absence of a failure in the controlling part 405 (step S202).

When a failure of the controlling part 405 is sensed (step S203: N), the monitoring part 50 controls the driving part 51 to maintain the water supply controlling part 431 in the closed state (step S204). Thus, water is not supplied to the nozzle 473. Accordingly, jetting from the nozzle 473 is prohibited (step S205).

When a failure in the controlling part 405 is not sensed (step S203: Y), the controlling part 405 determines the presence or absence of a failure in the monitoring part 50 (step S206).

When a failure of the monitoring part 50 is sensed (step S207: N), the controlling part 405 controls the driving part 51 to maintain the water supply controlling part 431 in the closed state (step S208). Thus, jetting from the nozzle 473 is prohibited (step S205).

When a failure of the monitoring part 50 is not sensed (step S207: Y), the controlling part 405 determines the presence or absence of a failure in the driving part 51 (step S209).

When a failure of the driving part 51 is sensed (step S210: N), the controlling part 405 controls the driving part 51 to maintain the water supply controlling part 431 in the closed state (step S211). Thus, jetting from the nozzle 473 is prohibited (step S205).

When a failure of the driving part 51 is not sensed (step S210: Y), jetting from the nozzle 473 is permitted (step S212).

Thus, the controlling part 405 and the monitoring part 50 mutually perform failure diagnosis. Accordingly, jetting can be prohibited immediately when trouble occurs in one of the controlling part 405 and the monitoring part 50. The failure diagnosis of the controlling part 405 by the monitoring part 50 (step S202) may be performed after the failure diagnosis of the monitoring part 50 by the controlling part 405 (step S206).

The failure diagnosis of the driving part 51 by the controlling part 405 (step S209) is performed after the failure diagnosis of the controlling part 405 by the monitoring part 50 (step S202) and the failure diagnosis of the monitoring part 50 by the controlling part 405 (step S206). The failure diagnosis of each part is performed in this order. Thus, the controlling part 405 can perform failure diagnosis on the driving part 51 after confirming that there is no failure in the controlling part 405. Accordingly, the failure diagnosis of the driving part 51 can be performed more reliably, and efficient failure diagnosis can be performed.

Steps S103-S110 shown in FIG. 5 are performed after step S122 shown in FIG. 6. Mutual failure diagnosis by the controlling part 405 and the monitoring part 50 is not limited to before starting jetting, but may be performed during jetting. Jetting from the nozzle 473 is prohibited also when a failure is sensed during jetting.

The failure diagnosis of the controlling part 405 (second functional part 405b) and the monitoring part 50 is described with reference to FIG. 7.

Figure 7:
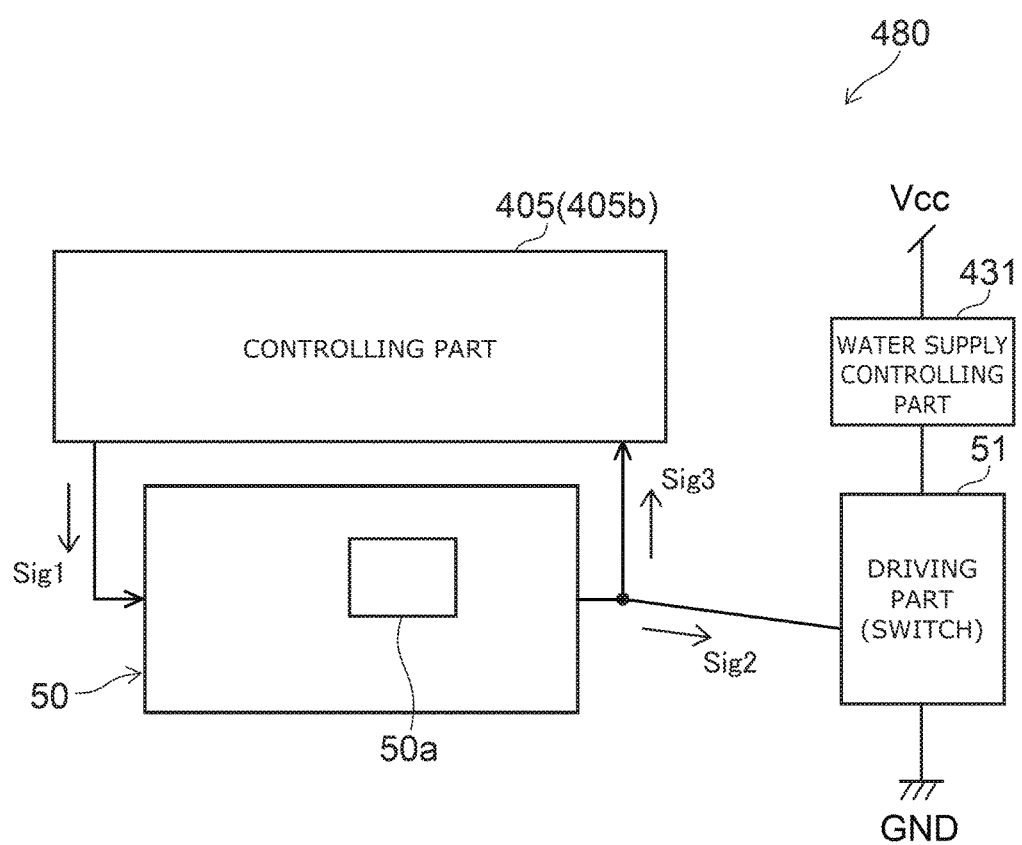
FIG. 7 is a block diagram illustrating part of the protective electronic circuit of the sanitary washing device according to the embodiment.

FIG. 7 is a block diagram illustrating part of the protective electronic circuit of the sanitary washing device according to the embodiment.

As shown in FIG. 7, the monitoring part 50 includes e.g. an integrated circuit (logic IC) 50a.

A first signal Sig1 is outputted from the controlling part 405 to the monitoring part 50. The first signal Sig1 is e.g. a signal of one of High and Low. For instance, the monitoring part 50 diagnoses that the controlling part 405 is normal (having no failure) when the first signal Sig1 is High. The monitoring part 50 diagnoses that the controlling part 405 is abnormal (having a failure) when the first signal Sig1 is Low. The monitoring part 50 converts the first signal Sig1 to a second signal Sig2 and outputs the second signal Sig2 to the driving part 51. When the controlling part 405 is abnormal (in failure), the driving part 51 is controlled in accordance with the second signal Sig2, and the water supply controlling part 431 is placed in the closed state.

The monitoring part 50 converts the first signal Sig1 to a third signal Sig3 like the second signal Sig2 and outputs the third signal Sig3 to the controlling part 405. Thus, a failure of the monitoring part 50 is diagnosed. In such a configuration, when a failure occurs in the controlling part 405 and the first signal Sig1 becomes a signal indicating abnormality, the monitoring part 50 can immediately control the driving part 51 to prohibit water supply to the nozzle 473.

Next, the configuration, operation, and failure diagnosis of the driving part 51 are described with reference to FIG. 8.

Figure 8:
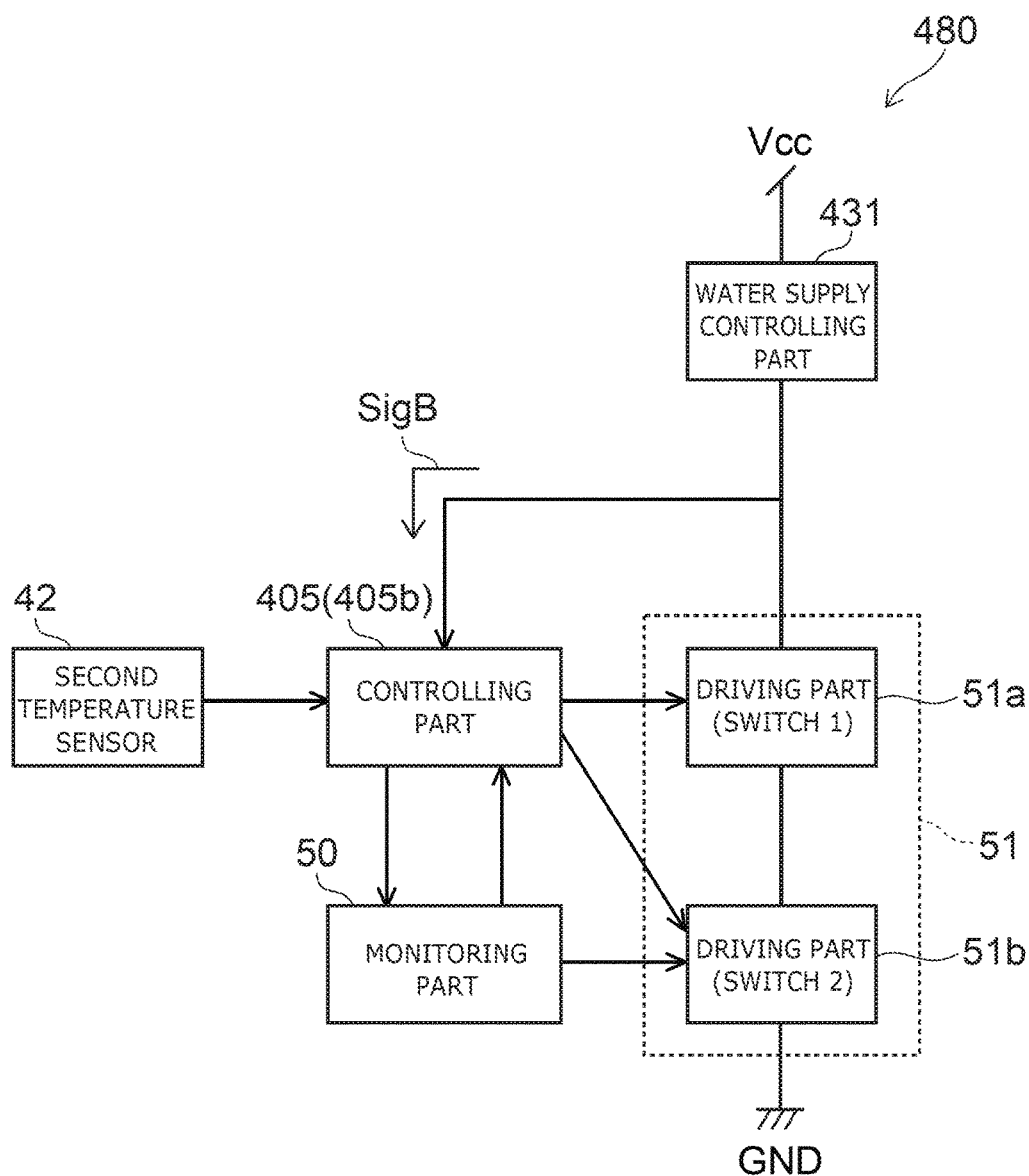
FIG. 8 is a block diagram illustrating part of the protective electronic circuit of the sanitary washing device according to the embodiment.

FIG. 8 is a block diagram illustrating part of the protective electronic circuit of the sanitary washing device according to the embodiment.

As shown in FIG. 8, the driving part 51 includes a first switch 51a and a second switch 51b. Each of the first switch 51a and the second switch 51b can be based on a switching element such as a transistor. The water supply controlling part 431, the first switch 51a, and the second switch 51b are connected in series. That is, the first switch 51a is connected to the water supply controlling part 431. The second switch 51b is connected to the first switch 51a and the ground GND.

When at least one of the first switch 51a and the second switch 51b is off, the water supply controlling part 431 is placed in the closed state. That is, water supply to the nozzle 473 by the water supply controlling part 431 is prohibited. By providing such two switches connected in series, even when one switch fails, water supply to the nozzle 473 can be prohibited by turning off the other switch. Thus, jetting of high-temperature water from the nozzle 473 can be prevented more reliably.

The controlling part 405 (second functional part 405b) is connected to each of the first switch 51a and the second switch 51b. Thus, the controlling part 405 (second functional part 405b) can switch on/off the first switch 51a and switch on/off the second switch 51b. The monitoring part 50 is connected to the second switch 51b. The monitoring part 50 can switch on/off the second switch 51b. In the example shown in FIG. 7, the monitoring part 50 switches on/off the second switch 51b. However, in the embodiment, the monitoring part 50 only needs to be able to switch at least one of the first switch 51a and the second switch 51b.

The controlling part 405 (second functional part 405b) turns off at least the first switch 51a when a failure of the monitoring part 50 is sensed by failure diagnosis. Thus, the water supply controlling part 431 is placed in the closed state irrespective of on/off of the second switch 51b.

The monitoring part 50 turns off the second switch 51b when a failure of the controlling part 405 (second functional part 405b) is sensed by failure diagnosis. Thus, the water supply controlling part 431 is placed in the closed state irrespective of on/off of the first switch 51a. At this time, the control for turning off the second switch 51b by the monitoring part 50 is prioritized even when the controlling part 405 (second functional part 405b) outputs a signal for turning on the second switch 51b.

The controlling part 405 (second functional part 405b) is inputted with a signal SigB corresponding to the potential difference between the driving part 51 and the water supply controlling part 431. The controlling part 405 (second functional part 405b) turns on/off each of the first switch 51a and the second switch 51b at the time of failure diagnosis of the driving part 51. This changes the potential between the driving part 51 and the water supply controlling part 431, and changes the signal SigB. A failure of the driving part 51 can be sensed based on the signal SigB.

Figure 9:
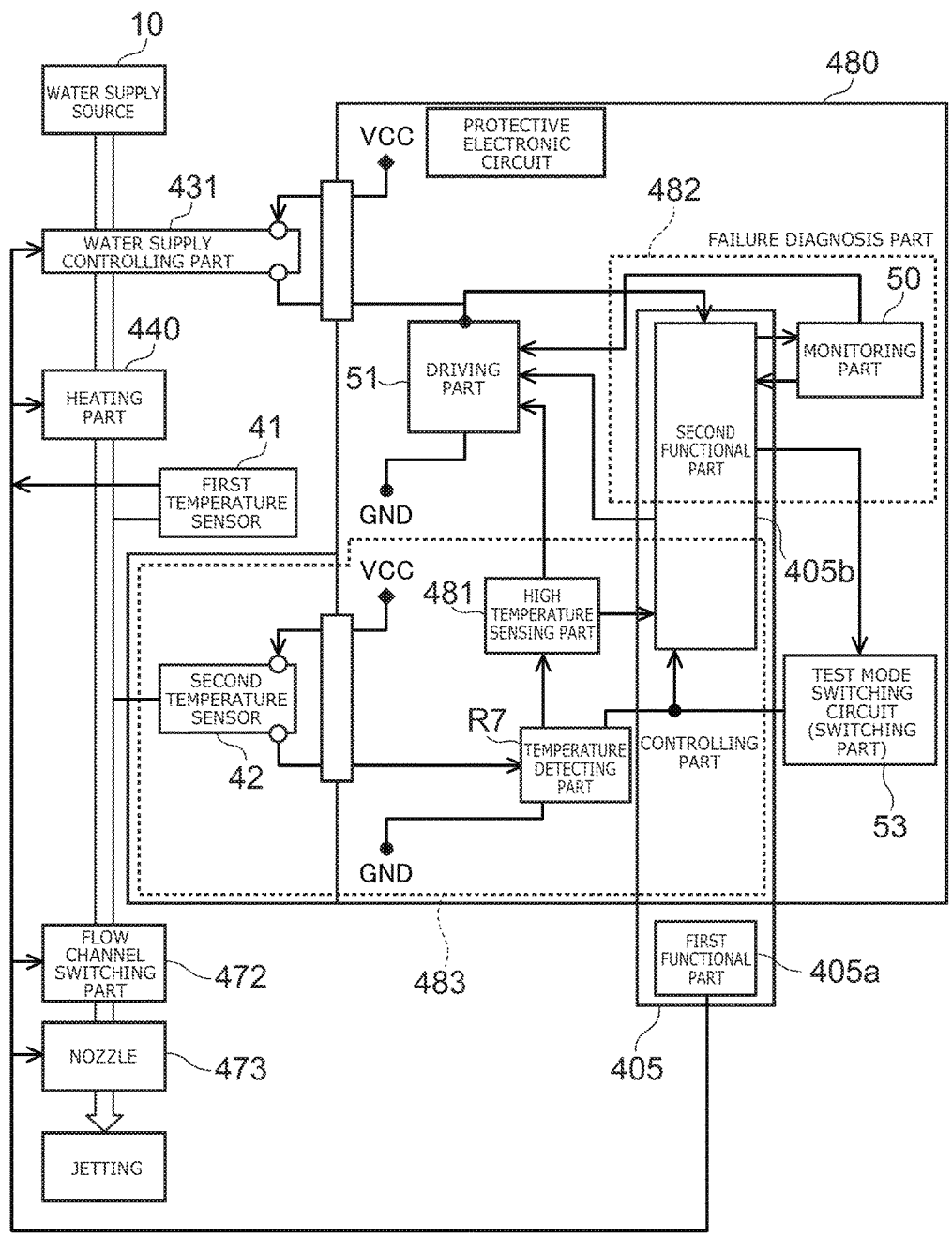
FIG. 9 is a block diagram illustrating an alternative configuration of the sanitary washing device according to the embodiment.

FIG. 9 is a block diagram illustrating an alternative configuration of the sanitary washing device according to the embodiment.

FIG. 9 shows the configuration of the water channel system and the electricity system in combination.

The example shown in FIG. 9 is different from the example shown in FIG. 3 in that the high-temperature jetting avoidance part 483 is further provided with a high temperature sensing part 481. In the embodiment, the high temperature sensing part 481 does not necessarily need to be provided. The high temperature sensing part 481 is e.g. a circuit including a comparator and obtains the information of the temperature sensed by the second temperature sensor 42. The high temperature sensing part 481 prohibits jetting from the nozzle 473 when the temperature sensed by the second temperature sensor 42 is higher than a predetermined temperature. For instance, when the temperature sensed by the second temperature sensor 42 exceeds a predetermined temperature, the high temperature sensing part 481 controls the driving part 51 to maintain the water supply controlling part 431 in the closed state. At this time, the controlling part 405 (second functional part 405b) is inputted with a signal from the high temperature sensing part 481 indicating that high temperature is sensed. In response to this signal, the controlling part 405 may house the nozzle 473, prohibit water supply to the nozzle 473 by the flow channel switching part 472, or prohibit energization of the heater of the heating part 440.

The protective electronic circuit 480 includes a test mode switching circuit (switching part) 53 for diagnosing a failure of the high temperature sensing part 481. The failure diagnosis of the high temperature sensing part 481 by the test mode switching circuit 53 is described with reference to FIG. 10.

Figure 10:
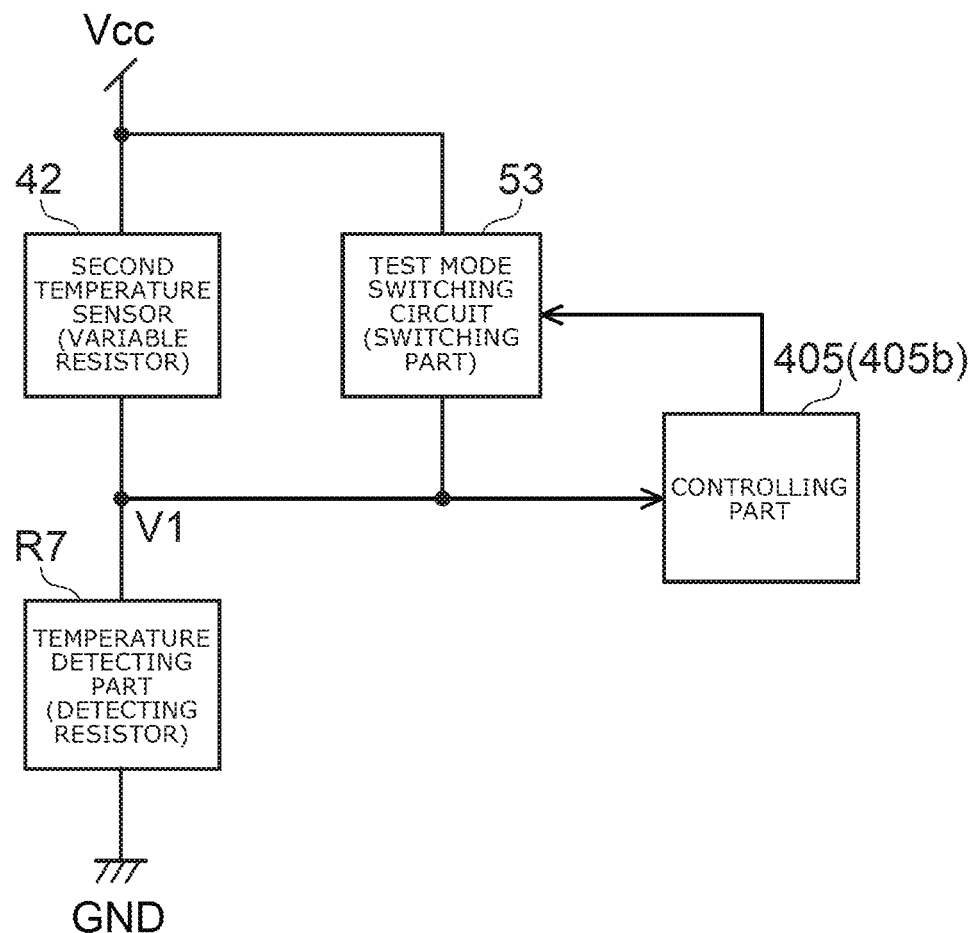
FIG. 10 is a block diagram illustrating part of the protective electronic circuit of the sanitary washing device according to the embodiment.

FIG. 10 is a block diagram illustrating part of the protective electronic circuit of the sanitary washing device according to the embodiment.

As shown in FIG. 10, a variable resistor of the second temperature sensor 42 and a temperature detecting part (detecting resistor) R7 are connected in series between the power supply voltage Vcc and the ground GND. The second functional part 405b of the controlling part 405 and the high temperature sensing part 481 are inputted with an output voltage V1 of the voltage dividing circuit composed of the variable resistor of the second temperature sensor 42 and the temperature detecting part (detecting resistor) R7. Based on the output voltage V1, the controlling part 405 and the high temperature sensing part 481 determine whether or not the temperature sensed by the second temperature sensor 42 is high temperature.

The test mode switching circuit 53 includes a switching element such as a transistor. The switching element is connected in parallel with the variable resistor of the second temperature sensor 42. That is, one end of the switching element is connected between the power supply voltage Vcc and the variable resistor of the second temperature sensor 42. The other end of the switching element is connected between the variable resistor of the second temperature sensor 42 and the temperature detecting part (detecting resistor) R7.

In the failure diagnosis of the high temperature sensing part 481, the controlling part 405 (second functional part 405b) turns on the switching element of the test mode switching circuit 53. Thus, the output voltage V1 is made substantially equal to the power supply voltage Vcc. This artificially produces a high-temperature state. That is, the high temperature sensing part 481 is inputted with an output voltage V1 like that obtained when the second temperature sensor 42 senses high temperature. Based on the output from the high temperature sensing part 481 at this time, the controlling part 405 (second functional part 405b) can diagnose a failure of the high temperature sensing part 481.

The control of the water supply controlling part 431 by the high temperature sensing part 481 is independent of the control by the controlling part 405. The high temperature sensing part 481 thus provided can suppress jetting of high-temperature water from the nozzle 473 even in the unlikely case that trouble occurs in the failure diagnosis of the controlling part 405 and the monitoring part 50. For instance, before starting jetting from the nozzle 473 (e.g. after step S207 and before S212 described with reference to FIG. 6), the controlling part 405 (second functional part 405b) diagnoses a failure of the high temperature sensing part 481 by the test mode switching circuit 53. When a failure of the high temperature sensing part 481 is sensed, the controlling part 405 (second functional part 405b) prohibits jetting from the nozzle 473. Thus, jetting of high-temperature water from the nozzle 473 can be suppressed more reliably.

Figure 11:
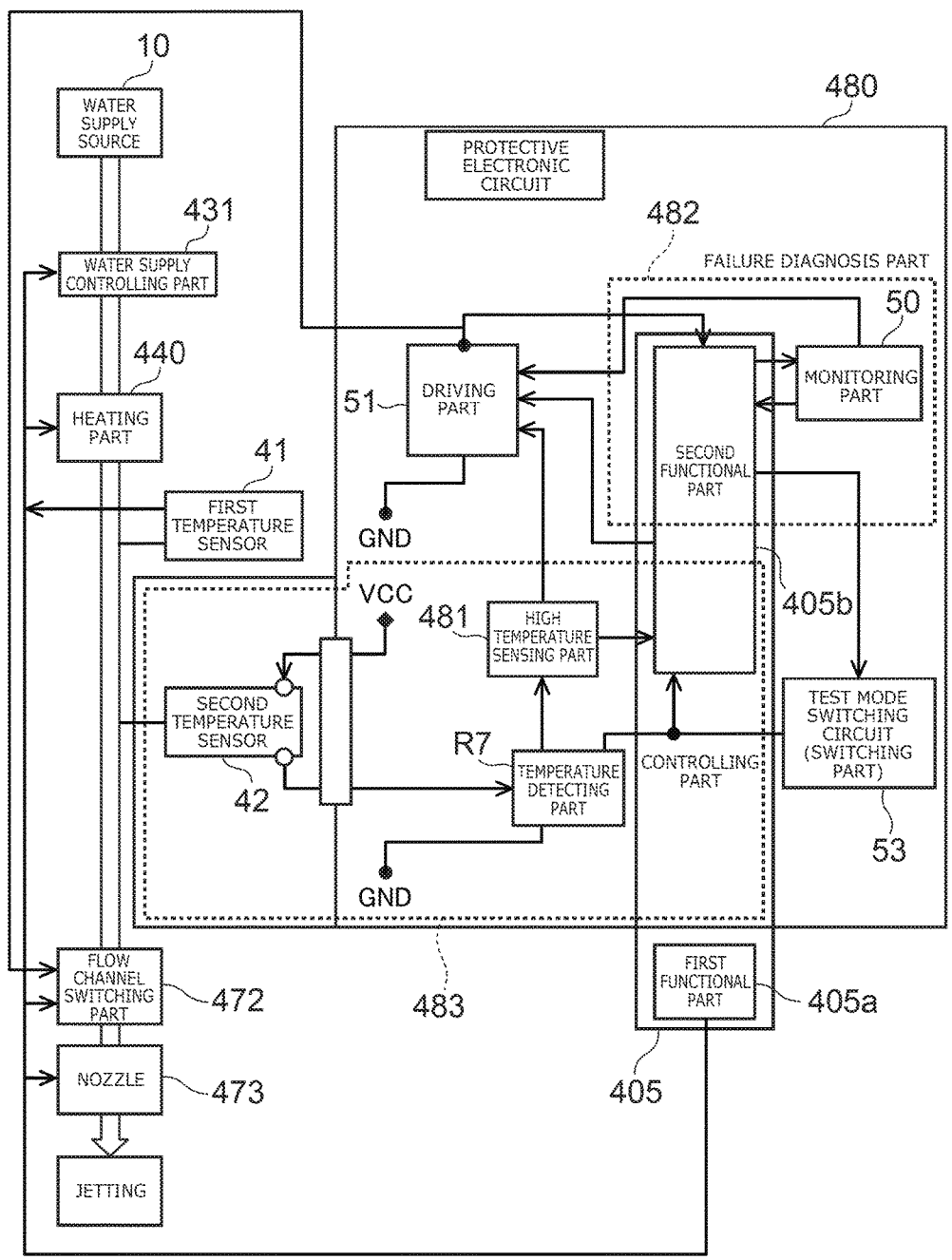
FIG. 11 is a block diagram illustrating an alternative configuration of the sanitary washing device according to the embodiment.

FIG. 11 is a block diagram illustrating an alternative configuration of the sanitary washing device according to the embodiment.

In this example, a failure of components of the protective electronic circuit 480 is sensed by diagnosis using the failure diagnosis part 482. Then, the flow channel switching part 472 is controlled to prohibit water supply to the nozzle 473 by the flow channel switching part 472. That is, the flow channel switching part 472 maintains either the state of selecting the flow channel other than the washing flow channel 21 or the state of stopping water from upstream in the flow channel switching part 472.

For instance, a failure of components of the high-temperature jetting avoidance part 483 is sensed by diagnosis using the failure diagnosis part 482. Then, the controlling part 405 (second functional part 405b) controls the driving part 51 to prohibit water supply to the nozzle 473 by the flow channel switching part 472. This can prevent jetting of high-temperature water from the nozzle 473 toward the human body.

The flow channel switching part 472 is provided at a position downstream of the heating part 440 and near the nozzle 473 on the water supply channel 20. Thus, water supply to the nozzle 473 is prohibited in the flow channel switching part 472 located on the downstream side. This facilitates suppressing jetting of high-temperature water toward the human body. For instance, this can suppress a situation such that high-temperature water leaks from the nozzle 473 in association with thermal contraction of e.g. the tank of the heat exchanger. For instance, the operating power consumption of the flow channel switching part 472 is lower than the operating power consumption of the electromagnetic valve and the gear pump. Thus, the power consumption at the time of sensing a failure can be suppressed by prohibiting water supply to the nozzle 473 in the flow channel switching part 472.

Figure 12:
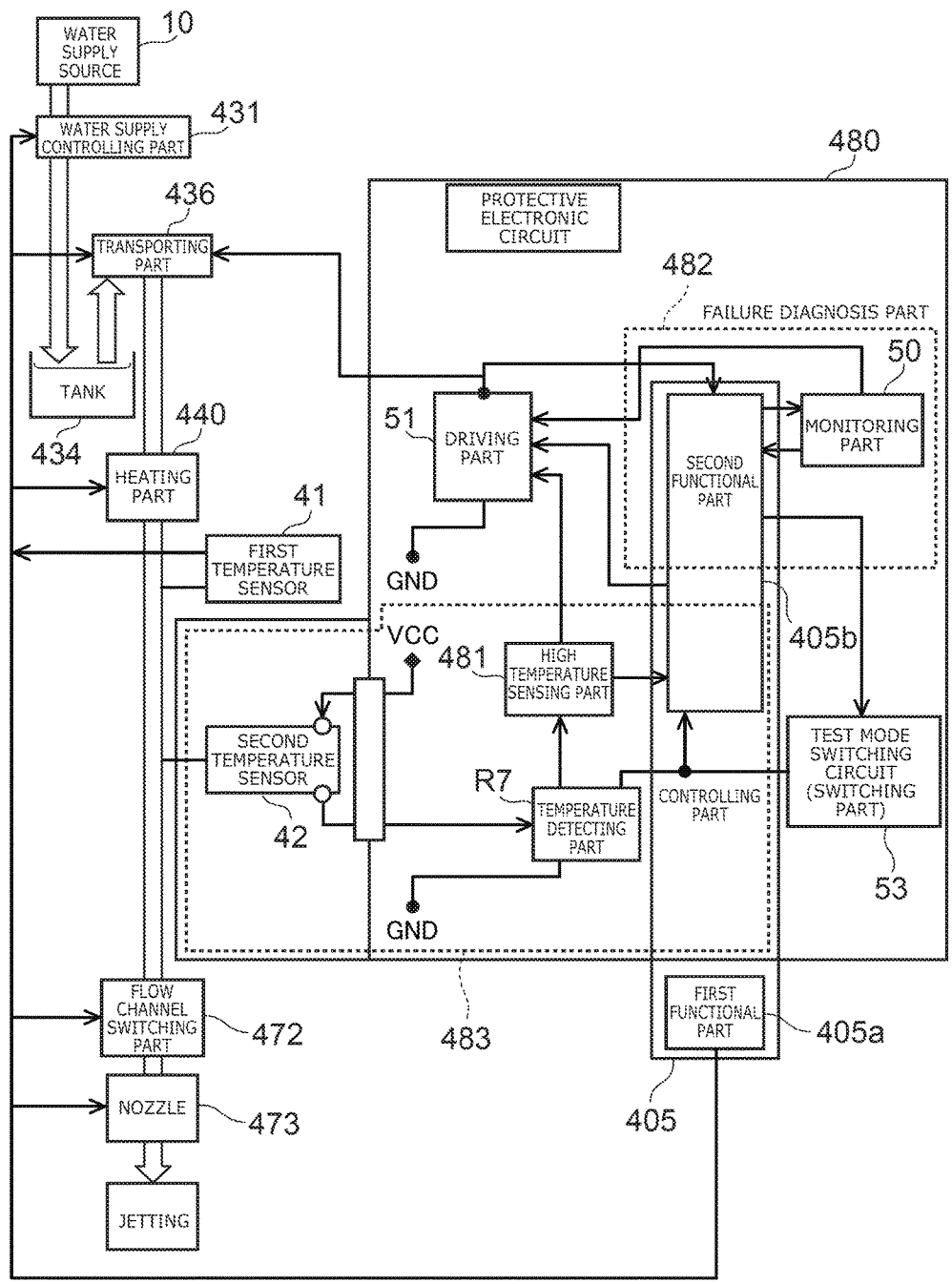
FIG. 12 is a block diagram illustrating an alternative configuration of the sanitary washing device according to the embodiment.

FIG. 12 is a block diagram illustrating an alternative configuration of the sanitary washing device according to the embodiment.

In the example shown in FIG. 12, an open tank 434 and a transporting part 436 are provided on the path of the water supply channel 20.

The open tank 434 (backflow prevention mechanism) is provided e.g. downstream of the pressure regulating part 432 described with reference to FIG. 2. The open tank 434 internally stores water flowing therein through the pressure regulating part 432. The open tank 434 internally forms an air gap. Thus, the flow of water directed from the downstream side of the open tank 434 to the upstream side is physically blocked in the water supply channel 20. In other words, the open tank 434 separates the portion of the water supply channel 20 on the downstream side of the open tank 434 from the portion on the upstream side. Thus, the open tank 434 reliably suppresses that wash water in the nozzle 473 and sewage stored in the bowl 801 flow back to the water supply source 10 (clean water) side.

The transporting part 436 is provided downstream of the open tank 434. The heating part 440 is provided downstream of the transporting part 436. The transporting part 436 is e.g. a gear pump. The transporting part 436 discharges water stored in the open tank 434. The transporting part 436 pumps out water stored in the open tank 434. Thus, the transporting part 436 transports water stored in the open tank 434 to e.g. the nozzle 473 on the downstream side of the open tank 434. The transporting part 436 is connected to the controlling part 405 (first functional part 405a). The controlling part 405 (first functional part 405a) can control driving and stopping of the transporting part 436. The transporting part 436 only needs to be an arbitrary pump capable of discharging water stored in the open tank 434.

In this example, a failure of components of the protective electronic circuit 480 is sensed by diagnosis using the failure diagnosis part 482. Then, the transporting part 436 is controlled to prohibit transport of water to the nozzle 473 by the transporting part 436. That is, the transporting part 436 maintains the state of stopping operation, i.e. the state of not pumping out water from the open tank 434.

For instance, a failure of components of the high-temperature jetting avoidance part 483 is sensed by diagnosis using the failure diagnosis part 482. Then, the controlling part 405 (second functional part 405b) controls the driving part 51 to prohibit transport of water to the nozzle 473 by the transporting part 436. This can prevent jetting of high-temperature water from the nozzle 473 toward the human body.

When a failure is sensed, the water supply controlling part 431 may be placed in the closed state to prohibit water supply to the nozzle 473. However, even if the water supply controlling part 431 is in the closed state, water remaining in the open tank 434 may be supplied to the nozzle 473 when the transporting part 436 is driven. Thus, in the case where the open tank 434 and the transporting part 436 are provided, it is preferable to prohibit transport of water by the transporting part 436 when a failure is sensed. This can prohibit water supply to the nozzle 473 even when water remains in the open tank 434.

As described above, when a failure is sensed by the failure diagnosis part 482, water supply to the nozzle 473 can be prohibited by controlling at least one of the water supply controlling part 431, the transporting part 436, and the flow channel switching part 472. The examples shown in FIGS. 4 to 10 have been described in the case where water supply to the nozzle 473 is prohibited by the water supply controlling part 431 when a failure is sensed. However, also in these examples, water supply to the nozzle 473 may be prohibited by controlling the transporting part 436 or the flow channel switching part 472 instead of the water supply controlling part 431 when a failure is sensed.

Figure 13:
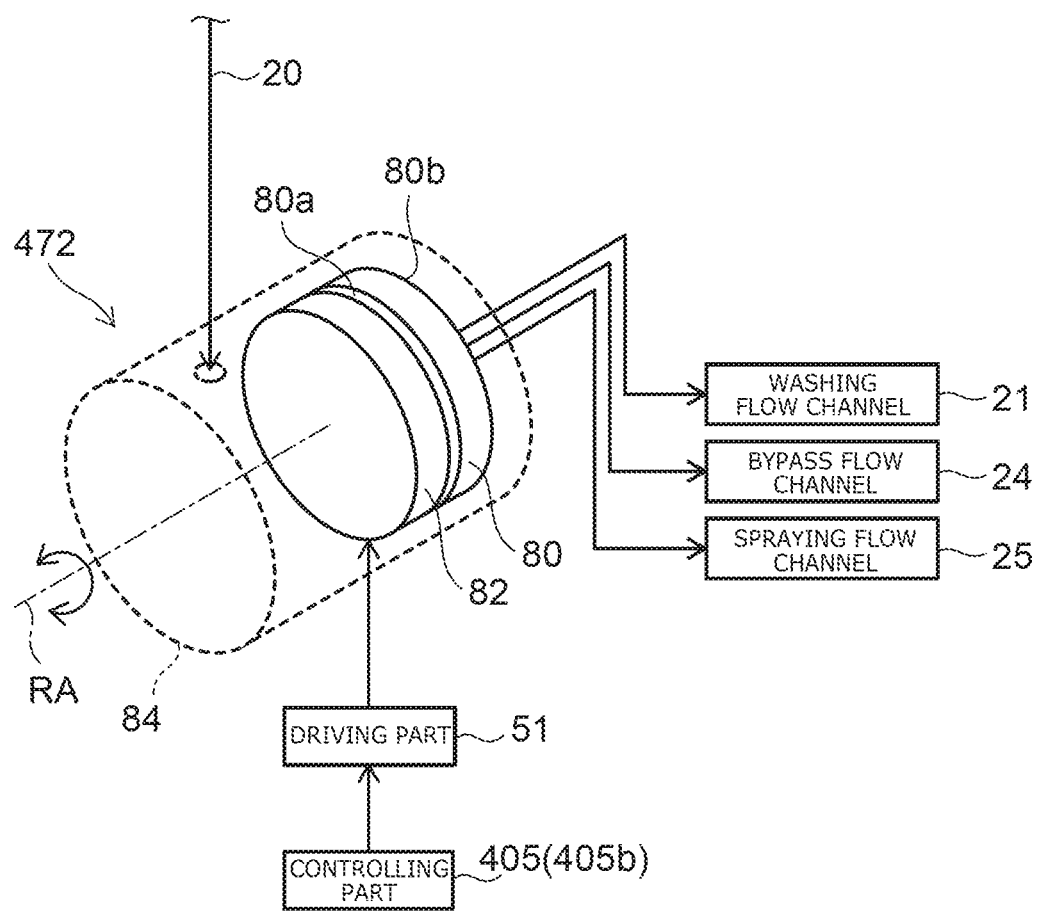
FIG. 13 is an illustrative view of the flow channel switching part of the sanitary washing device according to the embodiment.

FIG. 13 is an illustrative view of the flow channel switching part of the sanitary washing device according to the embodiment.

The flow channel switching part 472 includes a fixed disk (stator) 80, a movable disk (rotor) 82, and a housing 84.

The fixed disk 80 is shaped like e.g. a circular disk. The fixed disk 80 has a front surface 80a (the surface facing the upstream side) and a back surface 80b (the surface facing the downstream side) on the opposite side from the front surface 80a. The fixed disk 80 has a plurality of ports (openings) corresponding to the respective downstream flow channels of the flow channel switching part 472. For instance, the fixed disk 80 is provided with a port communicating with the washing flow channel 21, a port communicating with the bypass flow channel 24, and a port communicating with the spraying flow channel 25.

The movable disk 82 is shaped like e.g. a circular disk having a diameter comparable to that of the fixed disk 80. The movable disk 82 is provided on the upstream side of the fixed disk 80. The movable disk 82 abuts on the front surface 80a of the fixed disk 80. The movable disk 82 is slidably rotated on the front surface 80a about the axis (hereinafter referred to as rotation axis RA) in the direction orthogonal to the front surface 80a. The movable disk 82 has an opening corresponding to one port of the fixed disk 80. For instance, when the opening of the movable disk 82 overlaps one port of the fixed disk 80, the other ports of the fixed disk 80 are occluded by the movable disk 82. Thus, water can be passed to only one port overlapping the opening of the movable disk 82.

The flow channel switching part 472 selectively switches a port capable of passing water by rotating the movable disk 82. Thus, water can be selectively supplied to one of the washing flow channel 21, the bypass flow channel 24, and the spraying flow channel 25 in accordance with the selected port.

The housing 84 is shaped like e.g. a cylinder and houses the fixed disk 80 and the movable disk 82 in the internal space. The housing 84 rotatably supports the movable disk 82. The internal space of the housing 84 on the upstream side of the movable disk 82 is connected to the water supply channel 20 on the upstream side of the flow channel switching part 472. Water supplied through the water supply channel 20 on the upstream side is supplied from the internal space of the housing 84 through the movable disk 82 and the fixed disk 80 to each part.

In the example of FIG. 13, the driving part 51 includes e.g. an electric motor or a solenoid. The driving part 51 rotates the movable disk 82 by supplying a driving force to the movable disk 82. The driving part 51 is connected to the controlling part 405 (second functional part 405b). The driving part 51 rotates the movable disk 82 based on the control of the controlling part 405. The controlling part 405 (second functional part 405b) drives the driving part 51 to rotate the movable disk 82. Thus, the controlling part 405 switches the destination of water by selecting one of the ports of the fixed disk 80.

The driving part 51 may be an arbitrary mechanism capable of rotating the movable disk 82 without incurring water leakage. In the embodiment, the flow channel switching part 472 is not limited to the mechanism including a fixed disk and a movable disk, but may be an arbitrary mechanism capable of switching flow channels. For instance, the flow channel switching part 472 may be based on e.g. a three-way valve.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout, and placement of each element included in the sanitary washing device 100 are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A sanitary washing device comprising:
 a heating part;
 a first temperature sensor configured to sense temperature of water heated by the heating part;
 a second temperature sensor provided downstream of the first temperature sensor and configured to sense temperature of the water;
 a nozzle provided downstream of the second temperature sensor and configured to jet the water toward human private parts; and
 a controlling part configured to determine that the second temperature sensor is abnormal when change of the temperature sensed by the first temperature sensor is larger than a predetermined first value and change of the temperature sensed by the second temperature sensor is smaller than a predetermined second value.

2. The device according to claim 1, wherein the first value is larger than the second value.

3. The device according to claim 1, wherein the controlling part determines that the second temperature sensor is normal when the change of the temperature sensed by the second temperature sensor is larger than or equal to the second value irrespective of the change of the temperature sensed by the first temperature sensor.

4. The device according to claim 1, wherein
 the controlling part performs a first determination for determining whether or not the change of the temperature sensed by the second temperature sensor is smaller than the second value,
 after the first determination, the controlling part performs a second determination for determining whether or not the change of the temperature sensed by the first temperature sensor is larger than the first value, and
 after the second determination, the controlling part performs a third determination for determining whether or not the change of the temperature sensed by the second temperature sensor is smaller than the second value.

5. The device according to claim 1, wherein the controlling part prohibits water supply to the nozzle upon determining that the second temperature sensor is abnormal.

* * * * *